US009681104B2

(12) United States Patent
Billau et al.

(10) Patent No.: US 9,681,104 B2
(45) Date of Patent: *Jun. 13, 2017

(54) DISTRIBUTED CONTROL OF A HETEROGENEOUS VIDEO SURVEILLANCE NETWORK

(71) Applicant: International Business Machines Corporation, Armonk, NY (US)

(72) Inventors: Ronald L. Billau, Rochester, MN (US); Vincenzo V. Di Luoffo, Sandy Hook, CT (US); Dan P. Dumarot, Cornwall, NY (US); Matthew J. Paschal, Rochester, MN (US); Brandon W. Schulz, Rochester, MN (US); James E. Woodbury, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1177 days.

This patent is subject to a terminal disclaimer.

(21) Appl. No.: 13/751,013

(22) Filed: Jan. 25, 2013

(65) Prior Publication Data

US 2014/0132763 A1 May 15, 2014

Related U.S. Application Data

(63) Continuation of application No. 13/675,349, filed on Nov. 13, 2012.

(51) Int. Cl.
*G06F 15/173* (2006.01)
*H04N 7/16* (2011.01)
(Continued)

(52) U.S. Cl.
CPC .............. *H04N 7/162* (2013.01); *H04N 7/18* (2013.01); *G08B 13/19656* (2013.01);
(Continued)

(58) Field of Classification Search
CPC ........ H04N 7/162; H04N 21/00; H04N 21/25; G08B 13/19656; H04L 29/00
(Continued)

(56) References Cited

U.S. PATENT DOCUMENTS 6,119,096 A * 9/2000 Mann ...................... E05G 5/003
235/384
6,271,752 B1 8/2001 Vaios
(Continued)

FOREIGN PATENT DOCUMENTS

CN 101365118 A 2/2009
FR EP 1401205 A1 * 3/2004 ............. H04N 7/173

*Primary Examiner* — James Conaway
(74) *Attorney, Agent, or Firm* — Roy W. Truelson

(57) ABSTRACT

A surveillance video broker arbitrates access by multiple clients to multiple surveillance video sources. Both clients and sources register with the broker. Each source independently specifies respective clients permitted real-time access to its video and conditions of access, if any. Preferably, the video source is a local surveillance domain having one or more cameras, one or more sensors, and a local controller, the source specifying clients or client groups permitted access, and independently specifying conditions of access for each client or client group, where conditions may include scheduled events, non-scheduled events, such as alarms or emergencies, and/or physical proximity. The broker automatically authorizes real-time access according to pre-specified conditions. Preferably, the broker can also arbitrate alert notifications to the clients based on pre-specified notification criteria.

2 Claims, 18 Drawing Sheets

(51) Int. Cl.
*H04N 7/18* (2006.01)
*H04L 29/00* (2006.01)
*H04N 21/25* (2011.01)
*G08B 13/196* (2006.01)
*H04N 21/218* (2011.01)
*H04N 21/441* (2011.01)

(52) U.S. Cl.
CPC ........ *H04L 29/00* (2013.01); *H04N 21/21805* (2013.01); *H04N 21/25* (2013.01); *H04N 21/441* (2013.01)

(58) Field of Classification Search
USPC .................................................. 709/219, 225
See application file for complete search history.

(56) References Cited

U.S. PATENT DOCUMENTS

| | | | |
|---|---|---|---|
| 6,698,021 | B1 | 2/2004 | Amini et al. |
| 6,970,183 | B1 | 11/2005 | Monroe |
| 7,508,941 | B1 | 3/2009 | O'Toole et al. |
| 7,746,378 | B2 | 6/2010 | Shu et al. |
| 7,751,632 | B2 | 7/2010 | Liu et al. |
| 8,305,211 | B1 * | 11/2012 | Morris ............. G08B 13/19656 340/5.51 |
| 8,631,226 | B2 | 1/2014 | Rachamadugu |
| 8,780,199 | B2 | 7/2014 | Mimar |
| 8,934,754 | B2 * | 1/2015 | Billau ...................... H04N 5/76 386/226 |
| 9,041,812 | B2 * | 5/2015 | Billau .............. G08B 13/19682 348/143 |
| 9,071,807 | B2 * | 6/2015 | Billau ...................... H04N 7/18 |
| 9,191,632 | B2 * | 11/2015 | Billau .............. G08B 13/19682 |
| 2003/0062997 | A1 * | 4/2003 | Naidoo ............ G08B 13/19656 340/531 |
| 2003/0156192 | A1 | 8/2003 | Cho |
| 2004/0078825 | A1 * | 4/2004 | Murphy ................ H04N 7/147 725/109 |
| 2004/0080615 | A1 | 4/2004 | Klein et al. |
| 2005/0013417 | A1 * | 1/2005 | Zimmers ............. G08B 27/005 379/37 |
| 2005/0181762 | A1 * | 8/2005 | Kauppila ............... H04L 67/025 455/410 |
| 2006/0137018 | A1 * | 6/2006 | Herschaft ................ H04N 5/76 726/26 |
| 2006/0155851 | A1 * | 7/2006 | Ma .................... H04L 29/06027 709/226 |
| 2006/0209187 | A1 | 9/2006 | Farneman |
| 2007/0223424 | A1 * | 9/2007 | Su ......................... H04W 12/08 370/335 |
| 2007/0268121 | A1 * | 11/2007 | Vasefi .................... G06Q 10/06 340/506 |
| 2008/0020354 | A1 | 1/2008 | Goree et al. |
| 2008/0229211 | A1 * | 9/2008 | Herberger ............... H04L 63/10 715/744 |
| 2009/0021585 | A1 * | 1/2009 | Ko .................... G08B 13/19656 348/184 |
| 2009/0027495 | A1 | 1/2009 | Oskin |
| 2010/0039284 | A1 | 2/2010 | Hall et al. |
| 2010/0122091 | A1 * | 5/2010 | Huang .................. H04L 63/067 713/171 |
| 2010/0139290 | A1 | 6/2010 | Leblond |
| 2010/0149335 | A1 | 6/2010 | Miller |
| 2010/0245568 | A1 | 9/2010 | Wike et al. |
| 2011/0025847 | A1 | 2/2011 | Park et al. |
| 2011/0058034 | A1 * | 3/2011 | Grass ............... G08B 13/19656 348/143 |
| 2011/0109742 | A1 | 5/2011 | Laganiere et al. |
| 2011/0225238 | A1 * | 9/2011 | Shaffer .................... H04L 63/08 709/204 |
| 2012/0110096 | A1 * | 5/2012 | Smarr .................... G06Q 10/10 709/206 |
| 2012/0179742 | A1 * | 7/2012 | Acharya ................ H04N 7/18 709/202 |
| 2012/0224057 | A1 | 9/2012 | Gill et al. |
| 2013/0057696 | A1 | 3/2013 | Felt et al. |
| 2013/0121527 | A1 * | 5/2013 | Chambers ........ G08B 13/19613 382/103 |
| 2013/0265379 | A1 * | 10/2013 | Jia ......................... H04M 3/493 348/14.04 |
| 2014/0237493 | A1 * | 8/2014 | Russo .................... H04N 7/181 725/5 |
| 2015/0350887 | A1 * | 12/2015 | Huai ..................... H04W 4/22 455/404.1 |

* cited by examiner

DISTRIBUTED CONTROL OF A HETEROGENEOUS VIDEO SURVEILLANCE NETWORK

CROSS REFERENCE TO RELATED APPLICATIONS

This is a continuation of pending U.S. patent application Ser. No. 13/675,349, filed Nov. 13, 2012, entitled "Distributed Control of a Heterogeneous Video Surveillance Network", which is herein incorporated by reference. This application claims priority under 35 U.S.C. §120 of U.S. patent application Ser. No. 13/675,349, filed Nov. 13, 2012.

The present application is also related to the following commonly assigned copending U.S. patent applications, each of which are herein incorporated by reference:

Ser. No. 13/675,391, filed Nov. 13, 2012, entitled "Providing Emergency Access to Surveillance Video";

Ser. No. 13/675,429, filed Nov. 13, 2012, entitled "Automated Authorization to Access Surveillance Video Based on Pre-Specified Events";

Ser. No. 13/751,023, filed the same date as the present application, entitled "Providing Emergency Access to Surveillance Video"; and Ser. No. 13/751,029, filed the same date as the present application, entitled "Automated Authorization to Access Surveillance Video Based on Pre-Specified Events".

FIELD OF THE INVENTION

The present invention relates to digital data processing, and in particular to digital data systems for monitoring and control of a set of video surveillance devices including multiple video cameras at different locations.

BACKGROUND

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users. At the same time, the cost of computing resources has consistently declined, so that information which was too expensive to gather, store and process a few years ago, is no economically feasible to manipulate via computer. The reduced cost of information processing drives increasing productivity in a snowballing effect, because product designs, manufacturing processes, resource scheduling, administrative chores, and many other tasks, are made more efficient.

Among the applications of digital data processing technology is the capture, storage, transmission and other processing of images, both in still and motion video forms. A large variety of applications now process images is some form or another. So large is the demand for image processing that standard computer systems are now equipped with special processors and other hardware for that purpose, and a substantial amount of digital data storage is devoted to the storage of still and motion video images.

One particular application for the processing of images is video surveillance. Early video surveillance systems were essentially analog in design, typically capturing video on one or more analog video cameras and conveying a video feed by wired connection (e.g. coaxial cable) to a central monitoring station, at which security personnel could monitor and/or record the multiple feeds, and switch among the various feeds. These systems were typically relatively expensive, were limited in range, and required trained personnel for monitoring and maintenance. As a result, they were typically used only by sophisticated enterprises, and then only where a strong need was established which would justify the expense.

Digital imaging and digital networking have generally supplanted these analog designs and reduced the cost of processing video information. For example, it is now possible to capture video images using inexpensive digital video cameras, to transmit video via low-cost limited range wireless networks, wired LANs, or at greater ranges via the Internet or other networks, to display video on mass-produced consumer devices such as desktop personal computers, laptops, notebook computers, smart phones, and other portable digital devices, and to store large amounts of video on relatively inexpensive mass storage devices.

The capabilities of modern digital data processing and imaging devices have placed sophisticated video surveillance technology within practical reach of the homeowner or small business. For example, off-the-shelf systems may now be purchased by the homeowner or small business owner for monitoring an area with one or several cameras, transmitting video from the camera via a local wireless connection such as an IEEE 802.11 "WiFi" connection, collecting the video in a local computer system, and accessing the video, either in real time or after the fact, from a remote digital data device via the Internet.

The relatively low cost of modern digital surveillance technology, particularly small, off-the-shelf surveillance systems intended for homeowners and small businesses, has greatly increased the number of such surveillance systems in use. Furthermore, it can be expected that as public awareness of such systems increases, improvements are made to their capabilities and ease of use, and additional cost savings are realized, many more such systems will be installed.

The reduced cost of individual digital video components, such as digital video cameras and transmission hardware, has led to some far reaching proposals for digital surveillance. In some cases, it has been proposed that entire cities or neighborhoods within cities be placed under surveillance by some central authority, for use by police, firefighters and/or other emergency response personnel. However, although individual components of a video surveillance system are relatively inexpensive, when these components are multiplied by the number of components necessary to place large regions of a city under surveillance, the cost of such a system is very substantial. This cost is a major factor constraining the deployment of widescale surveillance systems. The fact that such systems are under serious consideration, and in some cases have even been deployed (although not necessarily on a comprehensive basis), is evidence of the perceived need for such systems.

In addition to the cost of the hardware, its installation and maintenance, there are other barriers to the deployment of comprehensive surveillance systems. A municipality or similar government agency has unrestricted access to only a portion of the area which it may be desirable to place under surveillance. Much of the subject area will be under the control of various private entities, any of which may balk at giving a government agency unrestricted surveillance rights over its property. It is taken for granted that a homeowner will be reluctant to grant surveillance rights to areas within a home, but even a private business will often be reluctant to allow unrestricted governmental surveillance over areas under its control, whether for use by its employees, customers and/or the general public.

While private businesses and individuals are understandably reluctant to allow unrestricted surveillance of their property by others, there are circumstances in which they may not only be willing, but desirous, of such surveillance. A prime example of such a circumstance is the occurrence of an emergency requiring the intervention of emergency response personnel, such as a fire, a criminal act, or a medical emergency. In such an event, access to surveillance video in real time by dispatchers, emergency responders, and the like, may improve the speed and efficacy of the response, outweighing any concerns about privacy. There are other circumstances, although less compelling, in which surveillance by others may be deemed desirable or acceptable simply because privacy is of minimal concern. For example, a private business may be willing to grant surveillance rights over an area at a time of day during which the business is closed and nobody is authorized to be on the premises.

A need exists, not necessarily recognized, for improved methods and systems for managing and accessing surveillance video, and particularly for conditionally accessing, by others, surveillance video under the control of a property owner, tenant, or the like.

SUMMARY

A video broker arbitrates access by multiple parties to multiple surveillance video sources. Each of multiple parties (acting as clients) registers with the video broker to obtain access to multiple video sources. Each of multiple surveillance video source controlling entities registers with the video broker and independently specifies one or more respective clients permitted real-time access to its video and conditions of access, if any, each client having independently specifiable access rights.

In one inventive aspect, one or more clients are granted conditional access to video by one or more surveillance video source controlling entities by defining respective one or more pre-specified conditions under which access is to be granted, the access being automatically granted if the corresponding one or more pre-specified conditions are met.

In another inventive aspect, the independent grant of video access rights by multiple video source controlling entities to multiple clients requires no one-to-one correspondence between source and client or sets of clients, and a first client is granted access to multiple sources but fewer than all of the sources, while a second client is granted access to some but not all of the sources to which the first client has access.

In another inventive aspect, each of multiple video source controlling entities further independently specifies rights by clients to receive alert notifications generated by systems under its control, and clients independently specify which alerts they will receive. Alert notifications are sent to the video broker, which determines which clients will receive notifications based on pre-existing specifications, and forwards notifications accordingly.

In a preferred embodiment incorporating these various aspects, a surveillance video source controlling entity (such as a property owner or tenant) collects surveillance video from one or more cameras in a local surveillance domain control system under its control, which may be a dedicated security system or a general purpose computer system which is used for various tasks, video surveillance being only one of the tasks. Preferably, surveillance video data is stored in the surveillance domain control system. Video may be transmitted in real time from the cameras to the surveillance domain control system via any of various known protocols using local wired or wireless connections. The surveillance domain control system has the capability to detect one or more alert events, either through input received from separate sensors (such as motion detectors, perimeter sensors, smoke and heat detectors, auditory sensors, etc.), or by analysis of the video itself. The surveillance domain control system communicates with a remotely located surveillance video broker over a network, which is preferably the Internet. The surveillance domain control system registers itself with the surveillance video broker, providing such information as may be useful to characterize the domain, such as the number and location of cameras under its control, data protocol used for video transmission, and so forth. In one or more embodiments, the surveillance domain may pre-specify to the broker the clients to receive notification of detected events, and the pre-defined conditions under which video from these cameras can be accessed by clients. In one or more alternative embodiments, the surveillance domain may specify clients to receive notification of detected events at the time it notifies the broker of the detected event, and/or specify pre-defined conditions to the broker when access is requested, or itself determine whether any pre-defined conditions are met. These pre-defined conditions could include any one or more of: (a) the identity or nature of the client desiring access; (b) an event state relating to recently occurring non-scheduled events, such as alert events; (c) a time of day, day of week, or other scheduled event; and (d) a physical proximity of a requesting client or agent of the client to the area under surveillance. Clients also register with the surveillance video broker independently of the surveillance domain control systems. Each client may independently provide in advance criteria specifying the alert events for which the respective client wishes to receive notice, or alternatively, filter any notifications within the client itself. Upon the detection of an alert event in the surveillance domain control system, an alert message is sent to the surveillance video broker. The broker compares the alert event parameters with any conditions placed on alert notification by the surveillance domain control system, as well as criteria specified by clients for receipt of alert notification (if any), to determine which client(s) should receive notification of the alert, and forwards an alert message to each client entitled to notification. A client can request real-time access to a camera under control of the local surveillance domain control system by communicating with the surveillance video broker (preferably over the Internet) and providing such identifying information as may be required. If the pre-defined conditions for access the video are met, access is automatically granted to the requesting client, which then receives transmission of the requested video in real time. For reasons of bandwidth, in one embodiment video is transmitted from the surveillance domain control system to a separate video distribution service having a high bandwidth network connection, and from there to as many clients as have requested and been granted access to it. Video could alternatively be transmitted directly from the surveillance domain control system to each requesting client. It will be understood that the preferred embodiment and certain alternatives described above are only some of the possible embodiments, and many additional variations are possible.

In one embodiment, a public authority may declare a state of emergency. If the surveillance video source controlling entity has previously authorized access to its video by selective persons, such as public authority emergency responders, under a "declared emergency" condition, access is automatically granted to such persons, without requiring additional authorization from the source controlling entity. All accesses are logged to provide an audit trail and inhibit excessive use of the "declared emergency".

By providing a flexible distributed mechanism for controlling a heterogenous set of surveillance video sources and providing alerts and video to appropriate clients as disclosed herein, surveillance video is easier to share, greater access to surveillance video can be obtained for use by emergency response personnel or other parties having a legitimate interest in it, and private parties do not have to unduly relinquish control over their own video sources. Furthermore, a flexible, distributed mechanism for controlling video surveillance as disclosed herein is readily adaptable to integration of pre-existing video surveillance systems into a larger surveillance network, thus reducing need for new installations and associated costs.

The details of the present invention, both as to its structure and operation, can best be understood in reference to the accompanying drawings, in which like reference numerals refer to like parts, and in which:

DETAILED DESCRIPTION

Figure 1:
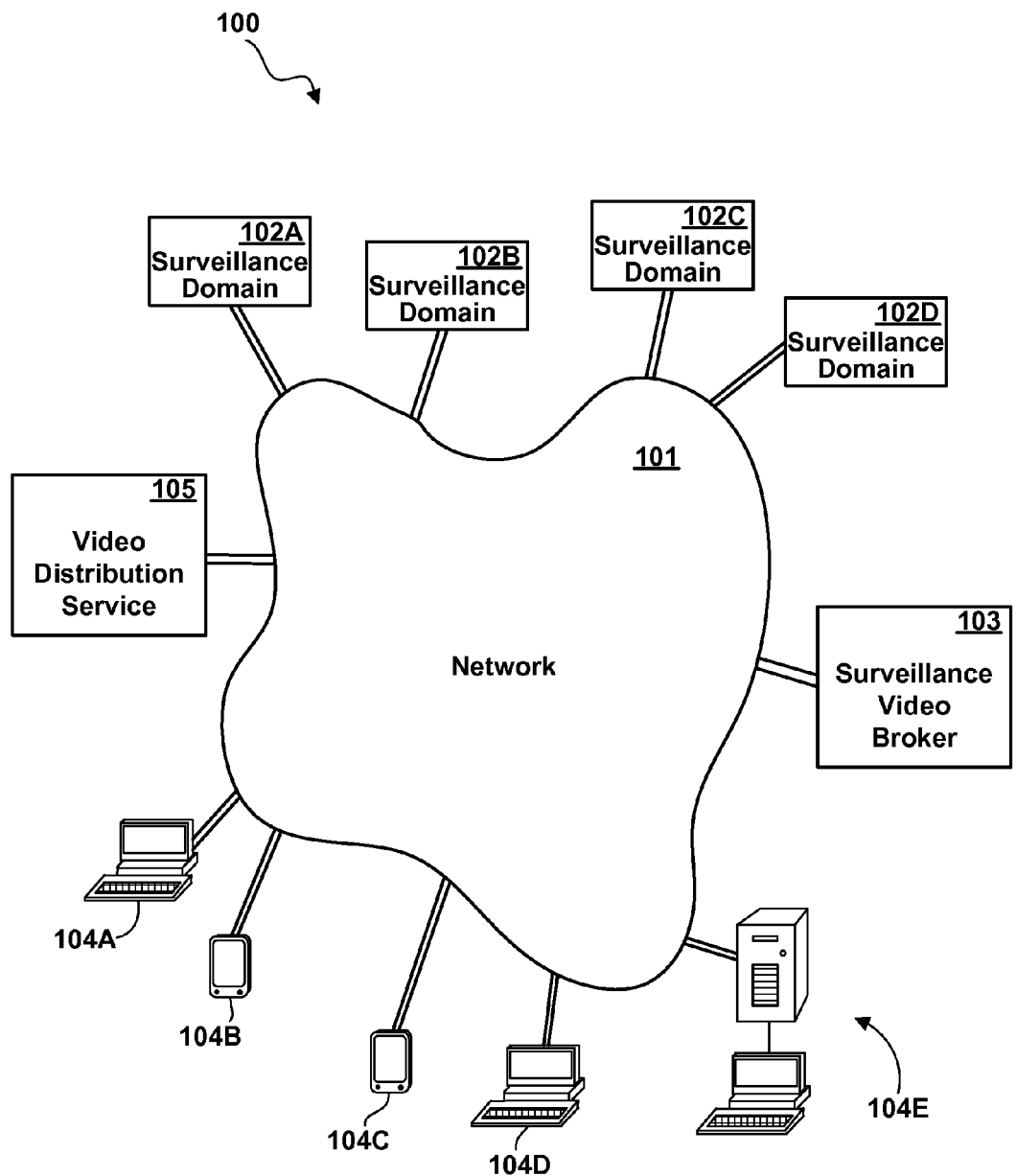
FIG. 1 is a high-level conceptual illustration of a networked surveillance system environment supporting distributed control of surveillance video, according to the preferred embodiment of the present invention.

Referring to the Drawing, wherein like numbers denote like parts throughout the several views, FIG. 1 is a high-level conceptual representation of a networked surveillance system environment 100 supporting distributed control of surveillance video, according to one or more preferred embodiments of the present invention. The environment includes a network (or collection of networks) 101. In the preferred embodiment network 101 includes the Internet, and may optionally be augmented by one or more cell phone networks for transmitting data to portable devices, it being understood that other networks or collections of networks could alternatively be used. Multiple surveillance domains 102A-D (herein generically referred to as feature 102) are each coupled to the network, each surveillance domain including one or more respective video cameras and serving as a source of surveillance video. Surveillance domains 102 may be of varying size, age and configuration, and are not owned or controlled by any common entity. Multiple client devices 104A-E (herein generically referred to as feature 104) are also coupled to the network. A client device may be any digital data device capable of communicating with network 101 and receiving video data therefrom originating in one of surveillance domains 102 for display to a user of the client device. For example, a client device could be any of: a general purpose digital computer of any type, from a large multi-user computer serving multiple attached terminals or workstations, to a single-user desktop or laptop personal computer; a personal digital assistant or similar portable device; a smart phone; an on-board vehicle computer and display; a special purpose security monitoring device; and so forth.

Surveillance system environment 100 further includes a surveillance video broker 103 coupled to network 101. Surveillance video broker 103 serves as a proxy for the passing of messages between surveillance domains 102 and clients 104, and manages access by clients 104 to video produced by surveillance domains 102 in accordance with access directives provided by the surveillance domains, as explained in greater detail herein. In a preferred embodiment, surveillance system environment further includes optional video distribution service 105 coupled to network 101. Video distribution service 105 receives video data produced by multiple surveillance domains 102, optionally stores the data, and re-transmits it to clients 104 as authorized by surveillance video broker 103. Surveillance video broker 103 and video distribution service 105 are shown in FIG. 1 as separate entities for purposes of representing the division of function performed by the surveillance video broker and the video distribution service. Broker 103 and distribution service 105 could in fact be separate physical systems at remote locations which communicate with each other over the Internet or other network, or could be separate physical systems at a common location which communicate with each other over a local area network or other local communications channel, or could be a single physical system which performs the functions of broker 103 as well as distribution service 105. Furthermore, broker 103 and distribution service 105 could be under the control of different entities or a common entity.

Figure 2A:
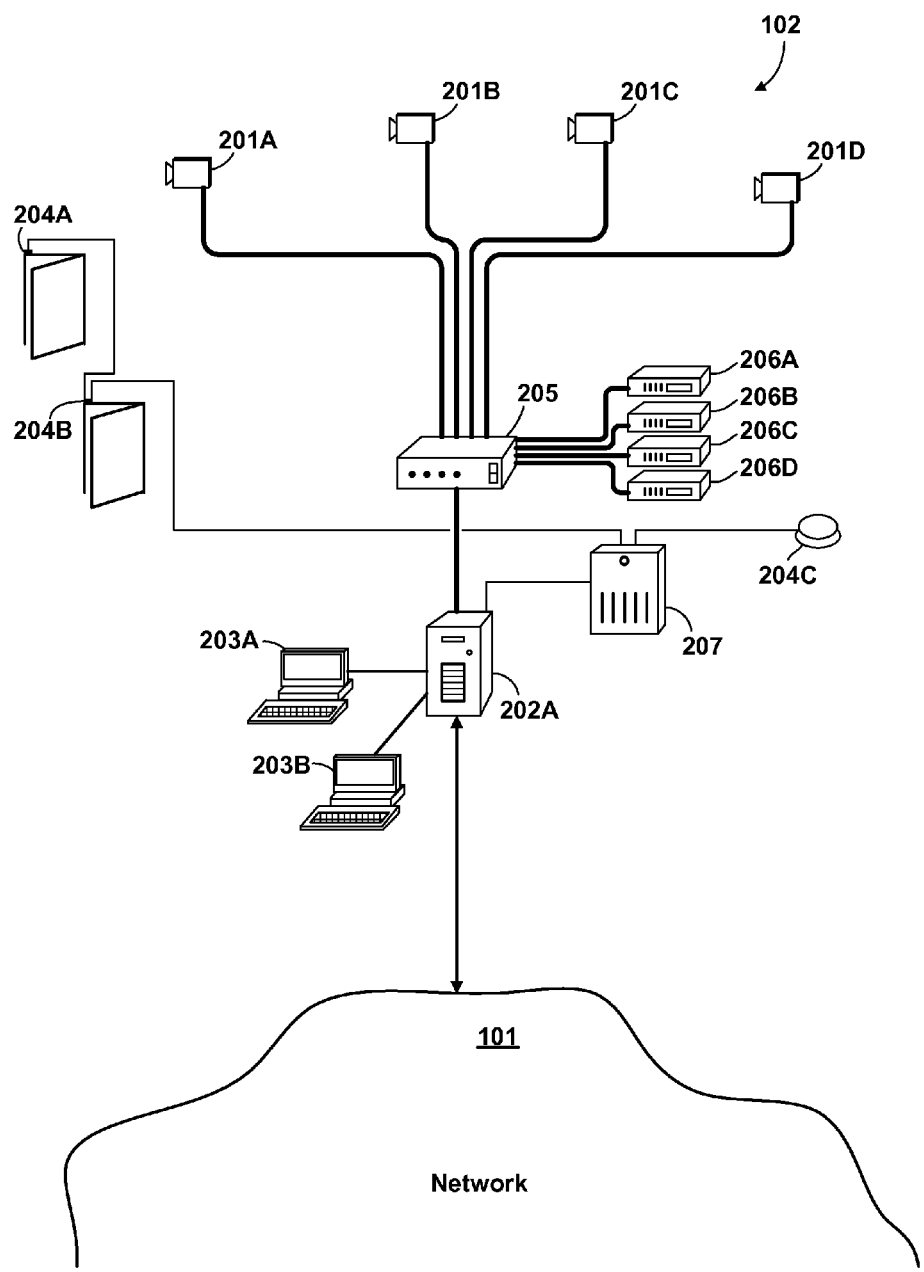
FIGS. 2A-2C illustrate several different variations of the major hardware components of exemplary surveillance domains, FIG. 2A representing a first exemplary surveillance domain, in the form of a legacy analog video surveillance domain, FIG. 2B representing a second exemplary surveillance domain, in the form of a surveillance domain using digital wireless technology, and FIG. 2C representing a third exemplary surveillance domain, in the form of a mobile surveillance domain, in accordance with one or more preferred embodiments.
Figure 2B:
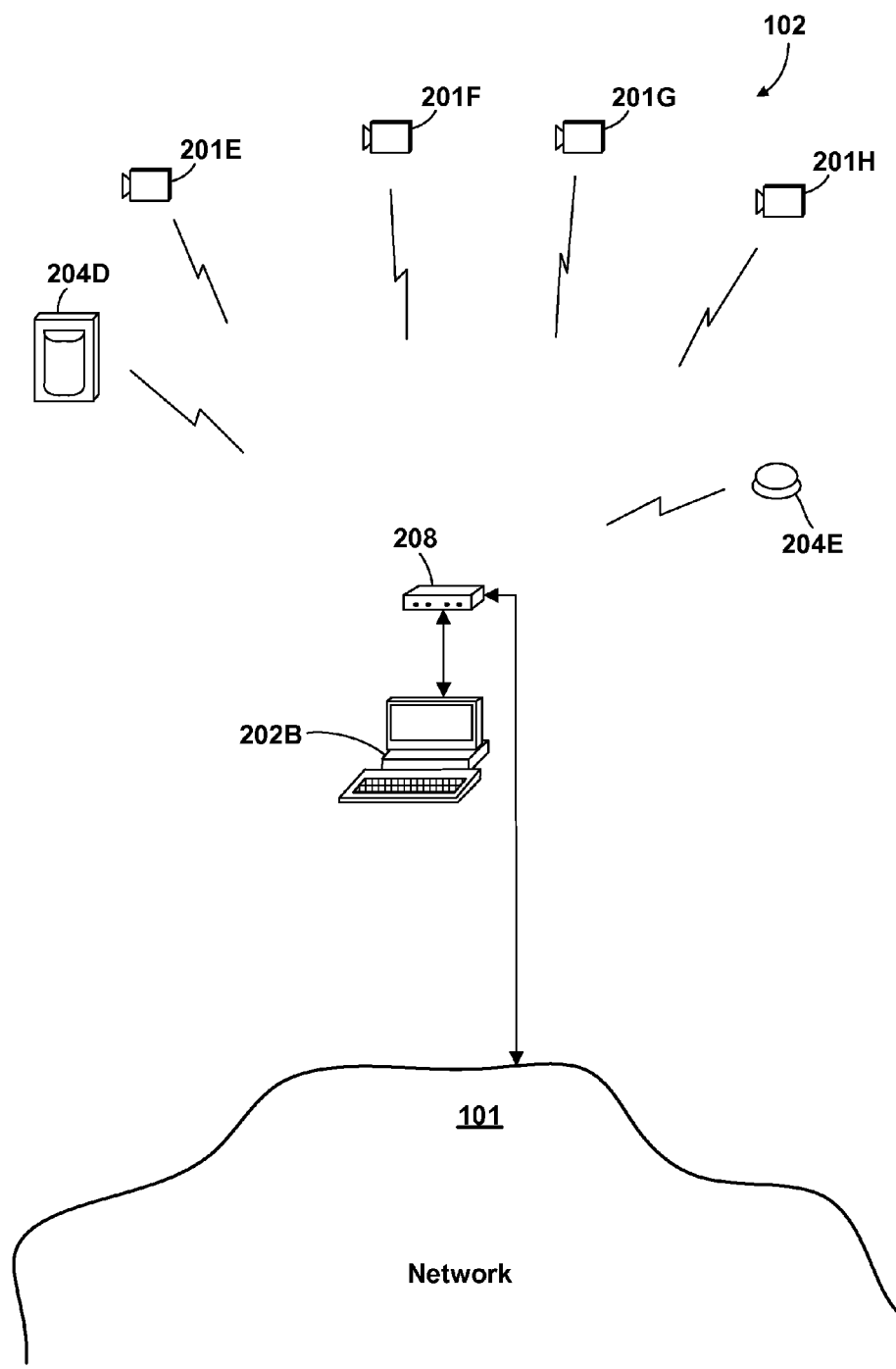
Figure 2C:
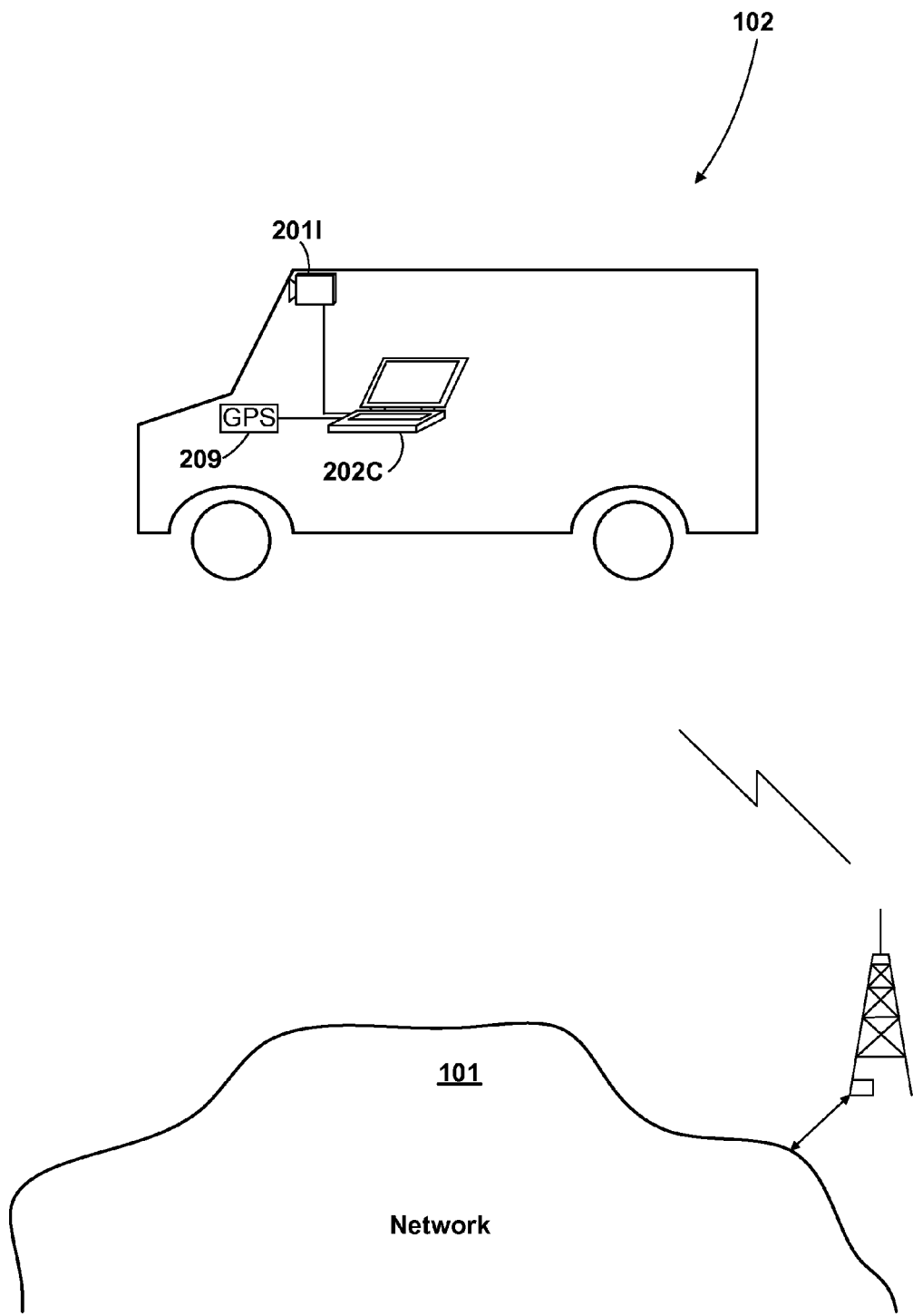

Although FIG. 1 represents a particular number of surveillance domains 102, client devices 104, and a single broker 103 and video distribution service 105, for illustrative purposes, it will be appreciated that the number of such device could vary, that the number of surveillance domains and client devices would typically be much larger, and that there may be multiple brokers 103 and/or distribution services 105 to provide redundancy and/or additional capacity FIGS. 2A-2C illustrate, in greater detail than shown in FIG. 1, several different variations of the major hardware components of exemplary surveillance domains 102, in accordance with one or more preferred embodiments. Common to each of these exemplary surveillance domains is at least one video camera 201A-I (herein referred to generically as feature 201) and a local surveillance domain control system 202A-C (herein generically referred to as feature 202) in communication with network 101 and capable of receiving video output from the at least one camera 201.

FIG. 2A represents a first exemplary surveillance domain, in the form of a legacy surveillance domain, in which each camera 201A-D produces an analog video signal and transmits it via a wired connection (e.g., coaxial cable) to a splitter/switch hub 205. Hub 205 has the capability to output a signal (via wired connection) to any of one or more analog video tape recorders 206A-D, and/or local surveillance domain control system 202A, and can output multiple copies of the same signal. Hub 205 may optionally output signals to local viewing monitors or other devices (not shown). Control system 202A is represented as a multi-user computer system, having multiple attached workstation terminals 203A, 203B. Control system 202A receives one or more analog video signals from hub 205, and converts the analog signal to an appropriate digital video format using embedded analog-to-digital video conversion hardware. Multiple sensors 204A-C, represented as wired perimeter sensors 204A, 204B which sense a door being opened and closed, and wired smoke/heat sensor 204C for sensing a fire, provide alarm signals to alarm controller 207. Alarm controller communicates an alarm signal to control system 202A over any appropriate communication link (e.g., a serial communication line), enabling control system 202A to detect alarm conditions. System 202A is coupled to network 101 via a wired connection. In such a legacy system, the cameras 201, hub 205, recorders 206, sensors 204 and/or alarm 207 could have been installed earlier than control system 202.

FIG. 2B represents a second exemplary surveillance domain, in the form of a surveillance domain using more modern digital wireless technology, in which each camera 201E-H produces a digital video signal and transmits it via a local wireless transmission (e.g., an IEEE 802.11 "WiFi" transmission) from the camera to wireless router 208. Wireless router is coupled to local surveillance domain control system 202B, which is represented in this case as a standalone single user desktop computer system, via a wired link, although the link could alternatively be wireless. Sensors 204D-E, represented as motion detector 204D and smoke/heat sensor 204E, are also in communication with router 208 via local wireless connection, allowing them to communicate alarm conditions to control system 202B. Router 208 is also connected to network 101, providing a means for control system 202B to communicated with the network.

FIG. 2C represents a third exemplary surveillance domain, in the form mobile surveillance domain in which a camera 201I as well as a local surveillance domain control system 202C is mounted in a moving object, such as a motor vehicle. Camera 201I is preferably a digital video camera, which may be directly coupled to control system 202C via a wired connection as shown, or may communicate by wireless connection. The motor vehicle preferably includes a global positioning system (GPS) 209 coupled to (or integrated with) control system 202C, allowing the location of the vehicle to be tracked. The vehicle may optionally include other sensors or devices (not shown) to provide input to control system 202C useful for operating camera 201 or generating alarms, such as directional sensors, speed sensors, collision detectors, and so forth. Control system 202C communicates via wireless connection with network 101, and may either contain an integrated wireless transceiver or be coupled to a separate wireless transceiver (not shown) mounted within the motor vehicle. Although the moving object is represented in FIG. 2C as a motor vehicle, a moving object need not be a motor vehicle or an object approximating its size, and could alternatively be a small handheld device, such as a smart phone containing integrated camera, control system, and/or optional devices.

In will be understood that FIGS. 2A-C are intended only to represent three different exemplary surveillance domains 102, and that many other variations or permutations of surveillance domains and surveillance domain components are possible in addition to those explicitly disclosed herein. In particular, without limiting the generality of the foregoing, the number and type of video cameras may vary; a single surveillance domain may contain a mixture of analog and digital video cameras; the number and type of sensors may vary; sensors of a type not shown may be present, such as glass breakage sensors, temperature sensors, gas leak sensors, water leak sensors, audio sensors, chemical spill sensors, radiation sensors, and so forth; any of various manually-tripped alarms could be coupled to system 202 to provide an alarm signal, such as well-known manually operated fire alarms, bank teller or store clerk alarms, and the like; components can communicate via wired or wireless links, and some components may be wired while others are wireless. While control system 202 is preferably a general purpose computer system suitably programmed to provide the functions described herein, it could be any of various digital devices, including portable and special-purpose devices, capable of communicating with network 101 and providing video and other data. Furthermore, control system 202 need not be a single computer system or device, but may be a collection of devices which provide the necessary function and/or provide redundancy. Furthermore, although a single communications link between network 101 and control system 202 is shown, there could be multiple link which could be redundant or which could be used to provide different types of data, e.g. one link used for video data while another is used for alarm signals and control data. Furthermore, although FIGS. 2A-C represent a common local control system 202 for controlling video surveillance data and for receiving sensor data upon which alert conditions are detected, a surveillance domain could alternatively include separate systems for controlling the video surveillance data and for detecting and communicating alert conditions, which may use a common or separate communication links for communicating with network 101.

It will be understood that a networked surveillance system environment 100 may contain many surveillance domains each having a different internal configuration, and the networked surveillance system environment is therefore not limited to surveillance cameras or surveillance domains of a particular type.

For clarity of illustration and understanding, the figures herein and accompanying description represent surveillance domains and clients as separate entities. However, a client device can be any digital device which performs the function corresponding to a client device as described herein. It would therefore be possible, for example, for local surveillance domain control system 202, which is preferably a suitable programmed general-purpose computer system, to also function as a client device. For example, such a local surveillance domain control system might be used as a client device to access surveillance video produced by nearby surveillance domains, or to receive alerts from nearby surveillance domains.

Each surveillance domain 102 is owned or controlled by a respective surveillance video source controlling entity, such as an owner or tenant of property under surveillance. Although one or more of the domains may be owned or controlled by a respective government agency, there is no common ownership or control of the surveillance domains. Specifically, in accordance with the preferred embodiment, at least some of the surveillance domains are under ownership or control of a private party, such as a business or homeowner (herein "privately-controlled surveillance domain"), and furthermore, at least some of the source controlling entities are different. Each video source controlling entity, whether a private party or public or quasi-public agency, independently defines the clients entitled to access its video and conditions for access. The authorized clients may be different for different domains, and the conditions for access need not be the same for all clients authorized to a single source domain, as explained in greater detail herein. Furthermore, preferably at least some of the authorized clients are not the respective video source controlling entity or persons affiliated therewith. Typically, a video source controlling entity will have unconditional access to the corresponding video it controls. Other clients may have unconditional access, but will often some form of conditional access. For example, access under one or more pre-specified conditions may be given to public authority emergency responders, neighbors, customers, passers-by on the street, and so forth. The surveillance video broker may be owned or controlled by one of the source controlling entities which controls a surveillance domain, or be a completely separate entity.

Figure 3:
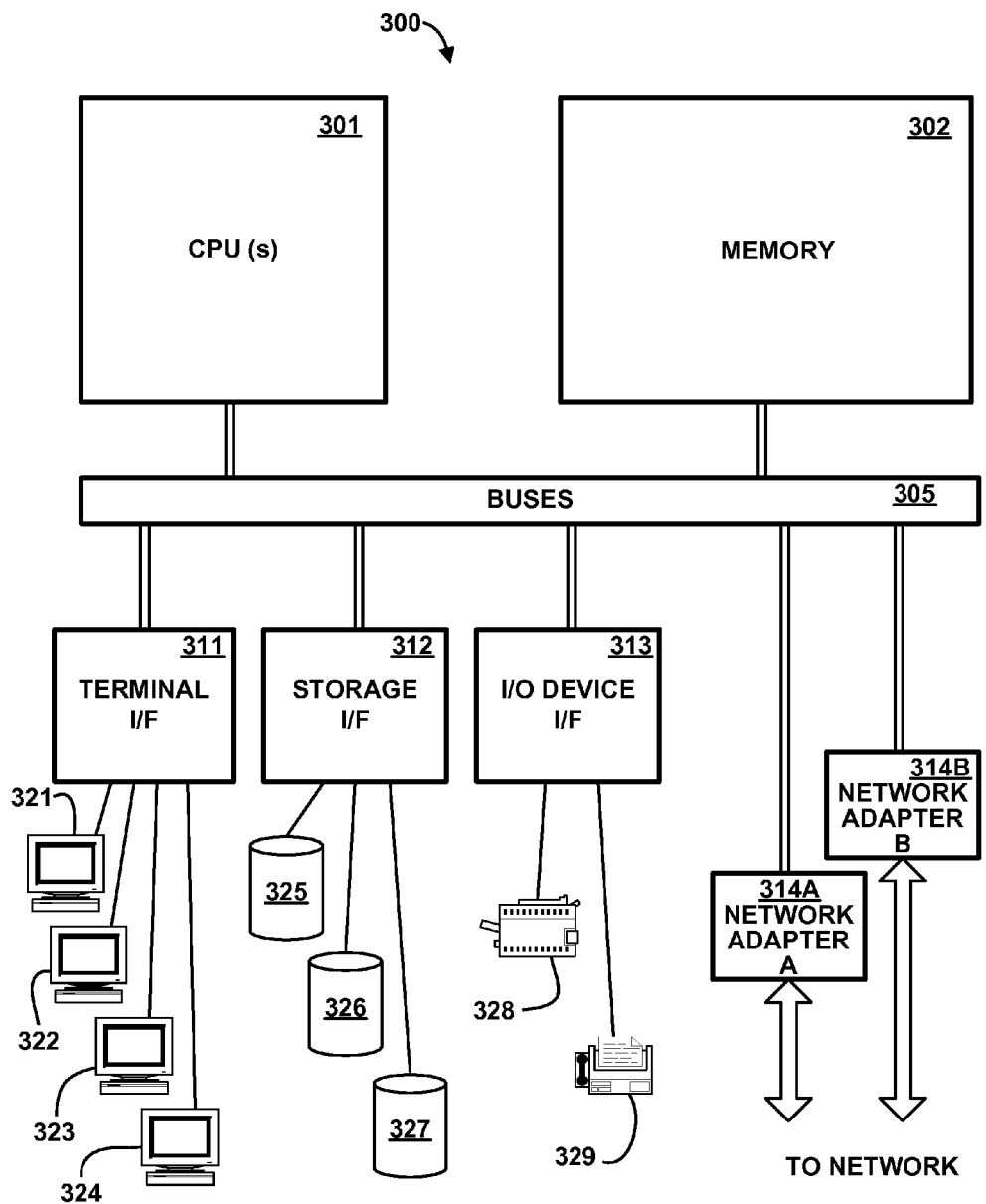
FIG. 3 is a high-level block diagram of the major hardware components of a representative general purpose computer system which could be used to perform the role of any of several functional elements, according to the preferred embodiment.

FIG. 3 is a high-level block diagram of the major hardware components of a representative general purpose computer system 300. In the preferred embodiment, surveillance video broker 103, video distribution service 105, one or more clients 104, and one or more surveillance domain control systems 202 are physically embodied as respective one or more general purpose computer systems, system 300 being a representation of any such general purpose computer system.

Computer system 300 includes at least one general-purpose programmable processor (CPU) 301 which executes instructions and processes data from main memory 302. Main memory 302 is preferably a random access memory using any of various memory technologies, in which data is loaded from storage or otherwise for processing by CPU 301.

One or more communications buses 305 provide a data communication path for transferring data among CPU 301, main memory 302 and various I/O interface units 311, 312, 313, 314A, 314B, which may also be known as I/O processors (IOPs) or I/O adapters (IOAs). The I/O interface units support communication with a variety of storage and I/O devices. For example, terminal interface unit 311 supports the attachment of one or more user terminals 321-324. Storage interface unit 312 supports the attachment of one or more direct access storage devices (DASD) 325-327 (which are typically rotating magnetic disk drive storage devices, although they could alternatively be other devices, including arrays of disk drives configured to appear as a single large storage device to a host). I/O device interface unit 313 supports the attachment of any of various other types of I/O devices, such as printer 328 and fax machine 329, it being understood that other or additional types of I/O devices could be used. Network interface adapters 314A, 314B (herein generically referred to as feature 314) support connections to one or more external networks for communication with one or more other digital devices, and specifically to network 101 for communication with devices represented in FIG. 1. While two network adapters 314 and network connections are shown, there may be only a single adapter and connection, or there could be more than two. Such external networks preferably include the Internet, and may include one or more intermediate networks, such as local area networks (not shown), through which communication with the Internet is effected.

It should be understood that FIG. 3 is intended to depict the representative major components of general purpose computer system 300 at a high level, that individual components may have greater complexity than represented in FIG. 3, that components other than or in addition to those shown in FIG. 3 may be present, and that the number, type and configuration of such components may vary, and that a complex computer system will typically have more components than represented in FIG. 3. Several particular examples of such additional complexity or additional variations are disclosed herein, it being understood that these are by way of example only and are not necessarily the only such variations.

Although only a single CPU 301 is shown for illustrative purposes in FIG. 3, computer system 300 may contain multiple CPUs, as is known in the art. Although main memory 302 is shown in FIG. 3 as a single monolithic entity, memory 302 may in fact be distributed and/or hierarchical, as is known in the art. E.g., memory may exist in multiple levels of caches, and these caches may be further divided by function, so that one cache holds instructions while another holds non-instruction data which is used by the processor or processors. Memory may further be distributed and associated with different CPUs or sets of CPUs, as is known in any of various so-called non-uniform memory access (NUMA) computer architectures. Although communications buses 305 are shown in FIG. 3 as a single entity, in fact communications among various system components is typically accomplished through a complex hierarchy of buses, interfaces, and so forth, in which higher-speed paths are used for communications between CPU 301 and memory 302, and lower speed paths are used for communications with I/O interface units 311-314. Buses 305 may be arranged in any of various forms, such as point-to-point links in hierarchical, star or web configurations, multiple hierarchical buses, parallel and redundant paths, etc. For example, as is known in a NUMA architecture, communications paths are arranged on a nodal basis. Buses may use, e.g., an industry standard PCI bus, or any other appropriate bus technology. While multiple I/O interface units are shown which separate buses 305 from various communications paths running to the various I/O devices, it would alternatively be possible to connect some or all of the I/O devices directly to one or more system buses.

Computer system 300 depicted in FIG. 3 has multiple attached terminals 321-324, such as might be typical of a multi-user "mainframe" computer system. Typically, in such a case the actual number of attached devices is greater than those shown in FIG. 3, although the present invention is not limited to systems of any particular size. Computer system 300 may alternatively be a single-user system, typically containing only a single user display and keyboard input. Furthermore, while the invention herein is described for illustrative purposes as embodied in a single computer system, the present invention could alternatively be implemented using a distributed network of computer systems in communication with one another, in which different functions or steps described herein are performed on different computer systems.

In the preferred embodiment, broker 103, video distribution service 105, local surveillance domain controllers 202, and at least some clients 104, are general purpose computer systems capable of being programmed to execute a variety of different functions by loading and executing appropriate software. However, any of these devices could alternatively be special-purpose digital data devices for accomplishing the corresponding functions. For example, one or more of client devices may be any of various smart phones or portable devices capable of receiving and displaying video to a user. As a further example, functions of a local surveillance domain controller 202 may be performed by one or more special purpose devices, e.g. alarm signals transmitted by a dedicated special purpose alarm controller while video is transmitted by a separate device, as might be used in legacy surveillance systems.

While various system components have been described and shown at a high level, it should be understood that a typical computer system contains many other components not shown, which are not essential to an understanding of the present invention.

Figure 4:
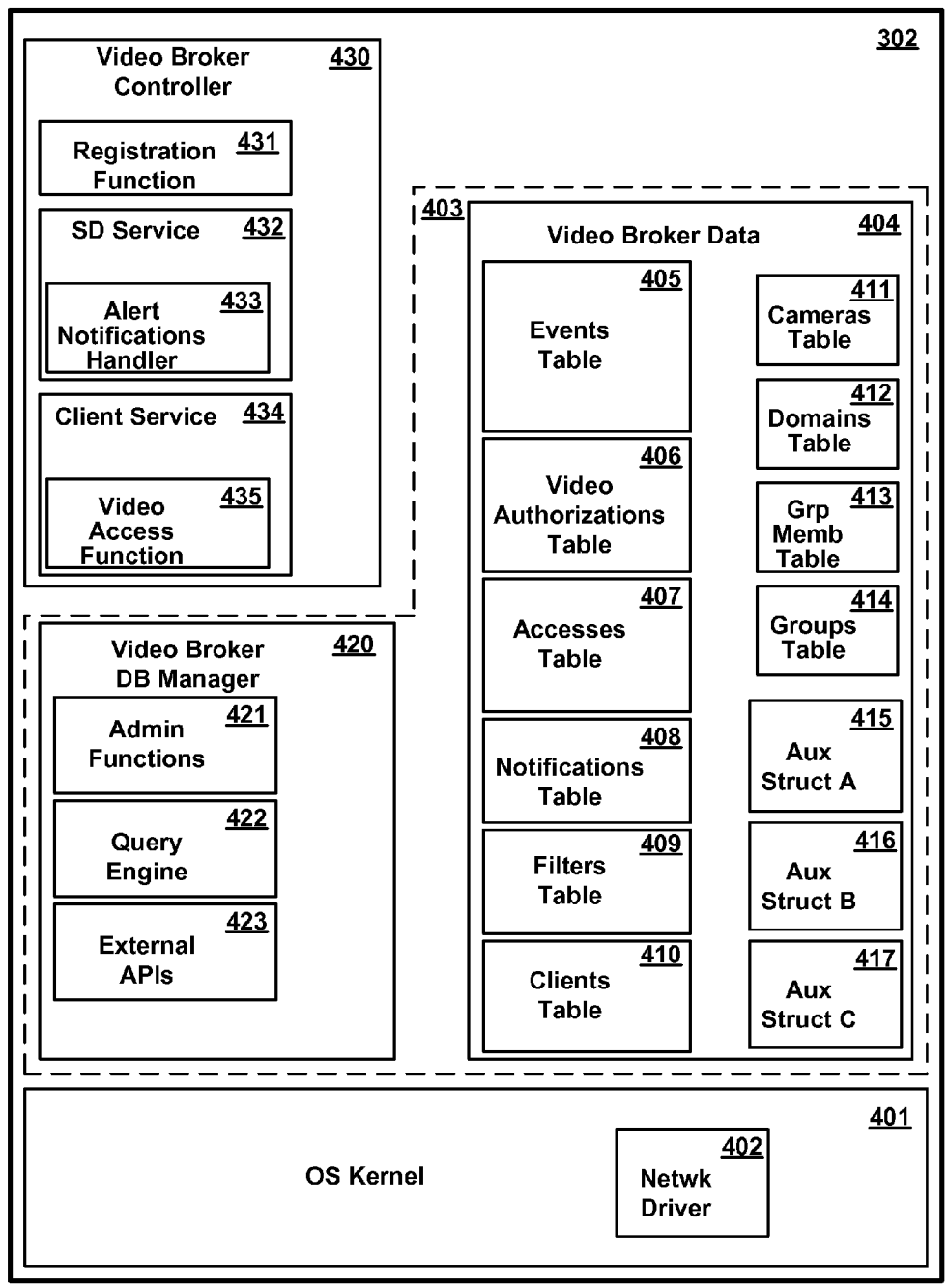
FIG. 4 is a conceptual illustration of the major software components of a computer system of FIG. 3 configured as a surveillance video broker computer system, according to the preferred embodiment.

FIG. 4 is a conceptual illustration of the major software components of computer system 300 in memory 302, configured to provide the function of a surveillance video broker 103, according to the preferred embodiment. Operating system kernel 401 is executable code and state data providing various low-level software functions, such as device interfaces, management of memory pages, management and dispatching of multiple tasks, etc. as is well-known in the art. In particular, OS kernel 401 includes one or more network adapter drivers 402 for handling communications with one or more external networks via network adapters 314. A video broker database 403 contains data structures and database management software for supporting the functions of surveillance video broker 103. Additionally, one or more software application programs collectively designated a video broker control program 430 executes various functions and accesses data in database 403 to provide the surveillance video broker services described herein.

Video broker database 403 is preferably a structured relational database containing various video broker data structures 404 and a video broker database manager 420 for managing and accessing the data structures 404. In the preferred embodiment, data structures 404 include an events table 405, video authorizations table 406, accesses table 407, notifications table 408, filters table 409 clients table 410, cameras table 411, surveillance domains table 412, group membership table 413, and groups table 414, and may contain additional tables (not shown). As is known in the database art, a database table is a data structure logically in the form of a table having multiple records (also called entries or tuples), each record having at least one, and usually multiple, fields (also called attributes). Although tables 404-414 are data structures which are logically equivalent to tables, they may be arranged in any suitable structure known in the database art. Associated with the database tables are one or more auxiliary data structures 415-417, also sometimes referred to as metadata (of which three are represented in FIG. 4, it being understood that the number of such structures may vary). Auxiliary data structures characterize the structure of the database and data therein, and are useful in various tasks involved in database management, particularly in executing queries against the database. Examples of auxiliary data structures include database indexes, materialized query tables, histograms, index advice record, and so forth, it being understood that other types of metadata may exist.

Figure 5:
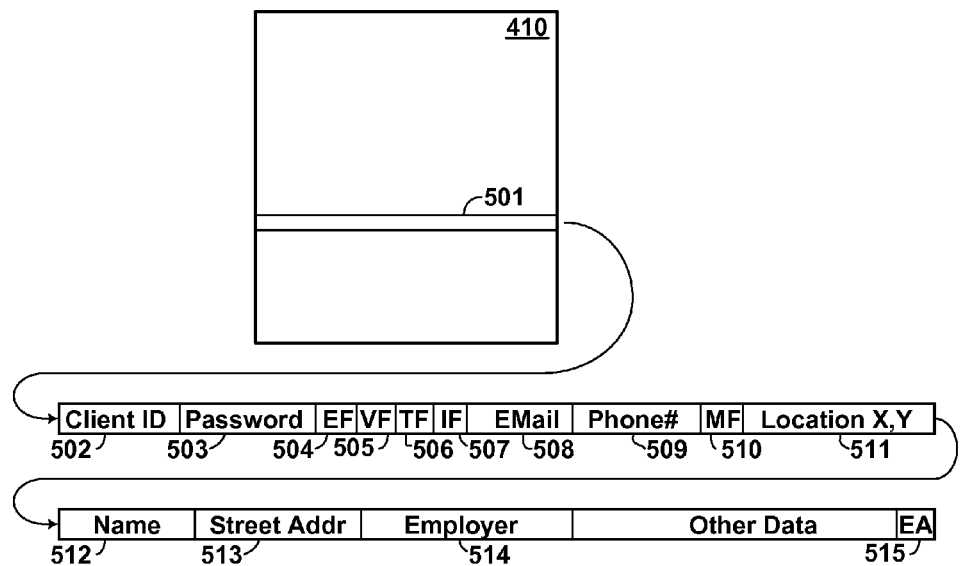
FIG. 5 is a conceptual illustration of a clients table in a video broker database, according to the preferred embodiment.

Clients table 410 contains multiple records, each record corresponding to a respective client 104 in networked surveillance system environment 100, which is registered with broker 103 (acting as a server) to access video produced by one or more of the surveillance domains 102 or perform administrative functions. FIG. 5 is a conceptual illustration showing in greater detail clients table 410 in video broker data 404, according to the preferred embodiment. Each record 501 in clients table 410 contains a client identifier (ID) 502, a password 503 for accessing the broker, and one or more fields specifying a preferred contact method for alert notifications. As represented in FIG. 5, these include e-mail flag 504, voice message flag 505, text message flag 506, and instant message flag 507, e-mail address 508, and telephone number 509. Flags 504-507 indicate, with respect to each method of contact, whether an alert notification is to be sent using the corresponding method. Multiple methods of contact might be specified. Mobile flag 510 indicates whether the client device is a mobile device In one variation of a preferred embodiment, one or more client records contain location information 511 specifying a current location of a client. Such information may be used to authorized access to video by the client or to filter alert notifications received by the client. If the client is a mobile client, this location information may be updated periodically by the client. The record may contain any of various additional fields useful to identify a client. For example, additional fields may include a name of a person 512, a street address 513, a place of employment 514, an e-mail address, a telephone number, and so forth. If the surveillance video broker services are provided for a fee, client table may further contain billing and payment information, although such information may be contained in a separate table (not shown).

A clients table entry 410 may further contain an emergency authorization flag 515, indicating whether the corresponding client has authority to declare a state of emergency. As explained herein, in one or more embodiments, an emergency condition may be temporarily declared by an authorized client, such as an appropriate public official, which can be used to facilitate greater access to surveillance video than might otherwise be possible. Clearly, such authority is subject to potential abuse, and therefore should be carefully limited. The emergency authorization flag 515, if present, is not directly accessible to or editable by the client, but can only be altered by a system administrator or similar individual who manages broker 103. Alternatively, emergency authorization is not stored in clients table 410 at all, but is stored in a separate record for security purposes (although it may logically be considered part of the client record).

Figure 6:
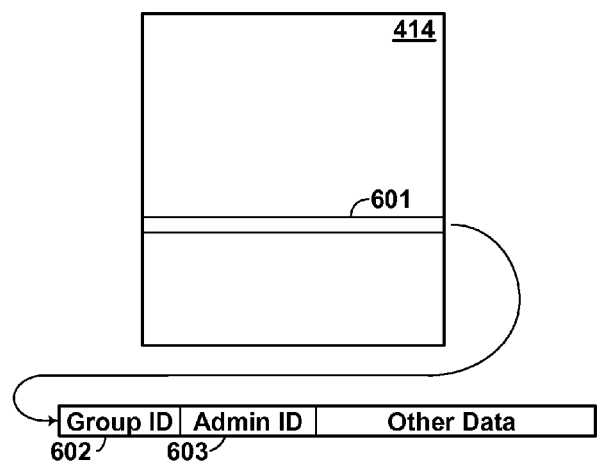
FIG. 6 is a conceptual illustration of a client groups table in a video broker database, according to the preferred embodiment.

Client groups table 414 contains multiple records, each records corresponding to a respective client group. In one aspect of the preferred embodiment, each client may belong to one or more client groups for purposes of obtaining services from broker 103. A group may be defined by a client, a surveillance domain, or by the video broker itself. In particular, the use of client groups allows a surveillance domain to grant video access to a group, without having to determine the identity of each member of the group. For example, access may be granted to a local fire department as a group, without the surveillance domain owner having to determine the identities of each employee of the local fire department, and without having to maintain such a list as employees enter or leave the fire department. FIG. 6 is a conceptual illustration showing in greater detail a client groups table 414 in a video broker database 404, according to the preferred embodiment. Each record 601 in groups table 414 contains a group identifier (ID) 602 and an administrator identifier (ID) identifying a client (or another group) having administrative authority for the group, i.e., having authority to delete from or add members to the group, and could optionally contain additional information about the group.

Figure 7:
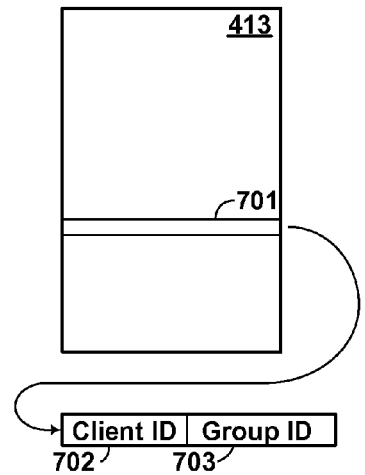
FIG. 7 is a conceptual illustration of a group membership table in a video broker database, according to the preferred embodiment.

Group membership table 413 is used in conjunction with groups table 414 to define the members of the group. FIG. 7 is a conceptual illustration showing in greater detail a group membership table 413 in a video broker database 404, according to the preferred embodiment. Each record 701 in group membership table 413 corresponds to a single instance of group membership, i.e., it contains a client ID 702 identifying a client and a group ID 703 identifying a group to which the client belongs. It will be observed that a client may belong to multiple groups by having multiple records in the group membership table.

Figure 8:
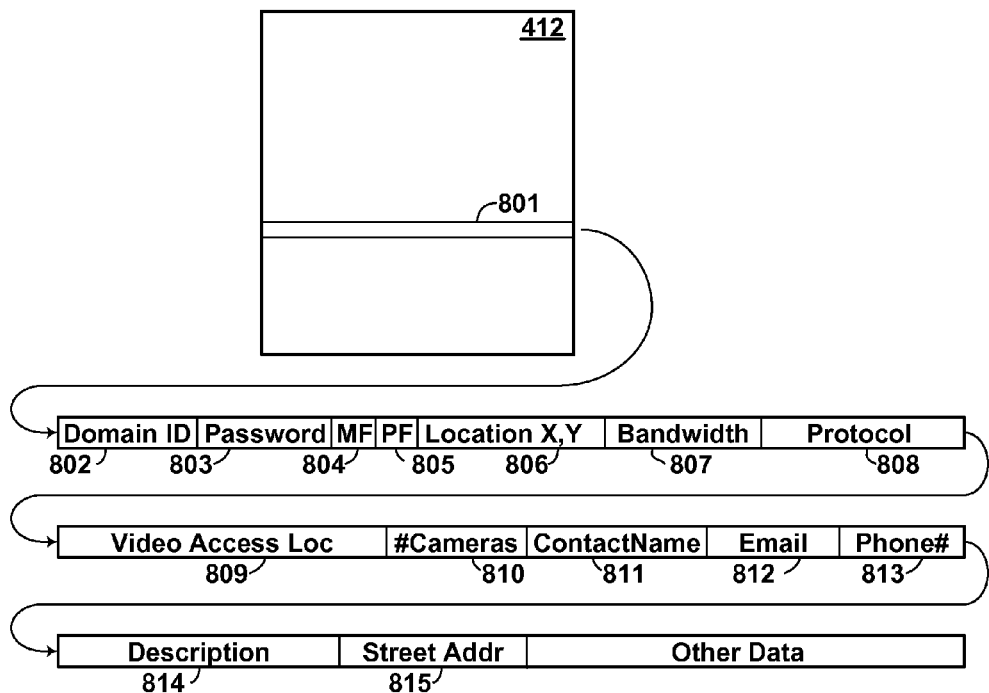
FIG. 8 is a conceptual illustration of a surveillance domains table in a video broker database, according to the preferred embodiment.

Surveillance domains table 412 contains multiple records, each record corresponding to a respective surveillance domain 102 in networked surveillance system environment 100. FIG. 8 is a conceptual illustration showing in greater detail a surveillance domains table 412 in a video broker database 404, according to the preferred embodiment. Each record 801 in surveillance domain table 412 contains a surveillance domain identifier (ID) 802 and a password 803. A surveillance domain record 801 and may contain any of various additional fields useful to define the parameters of the surveillance domain. For example, where some of the domains are mobile domains, surveillance domain record 801 preferably contains a mobile flag 804 indicating whether the domain is a mobile domain. A privacy flag 805 may be used to indicate whether the surveillance domain is visible to clients not authorized to access it. I.e., if a client performs a search of surveillance domains, as described further herein, privacy flag will prevent the surveillance domain from being disclosed to the client in the search results if the client is not authorized to access surveillance video of the domain. Further information in record 801 may include any or all of: a location of a surveillance domain 806 (this information being periodically updated in the case of a mobile domain); the bandwidth of network connection(s) available to the domain 807; protocol used by the video signal output by the domain 808; a video access location specifying where or how the surveillance video may be accessed, such as a network address of a video distribution service 105 or a network address of a server within the surveillance domain which provides the video; the number of cameras in the domain 810, a name 811, email 812 and phone number 813 of a responsible contact person, a natural language description of the domain 814 (e.g. "Carl's Sporting Goods store"), a street address of the domain 815, and such other data as may be useful to describe the domain or its characteristics.

Figure 9:
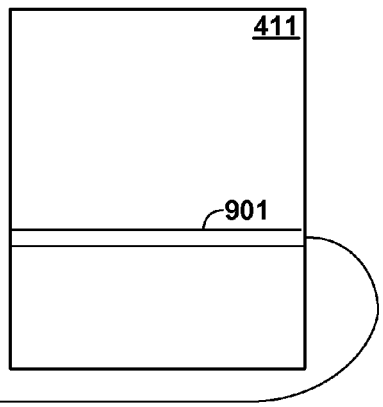
FIG. 9 is a conceptual illustration of a cameras table in a video broker database, according to the preferred embodiment.

Cameras table 411 contains multiple records, each record corresponding to a respective video surveillance camera 201. FIG. 9 is a conceptual illustration showing in greater detail a cameras table 411 in a video broker database 404, according to the preferred embodiment. Each record 901 in cameras table 411 contains a camera ID 902 of the corresponding camera, a surveillance domain ID 903 identifying the surveillance domain to which the camera belongs (each camera belonging to one and only one surveillance domain in the preferred embodiment), and a camera group ID 904 identifying an optional camera group within the surveillance domain. Both the camera ID and the optional camera group ID may be assigned by the surveillance domain, and need only be unique within that surveillance domain. The purpose of the camera group is to allow multiple cameras to be designated by a single authorization. Its purpose is therefor similar to the client group, but because a single camera can belong to only a single group, and that group must be part of a surveillance domain, there is no separate camera groups table or camera group membership table, as there is in the case of client groups. It would alternatively be possible to allow each camera to be a member of multiple camera groups by using additional tables as in the case of client groups. A record 901 may contain any of various additional fields useful to define the parameters of the camera, in particular a location of the camera 905 and azimuth of its orientation 906, any of various control parameters 907 which may be available, such as zoom or directional controls, a natural language description 908 of the camera, in particular its field of view (e.g., "front door", "parking lot", etc.), and any other useful data. The location of the camera may be unnecessary for many surveillance domains, given that the domain itself has a location, but there are some relatively large domains for which location information could be important.

Notifications table 408 and filters table 409 are used to regulate the transmission of alert notifications generated in a surveillance domain to one or more clients, notifications table 408 being used to specify authorized recipients of alert notifications and filters table 409 being used to specify filters parameters of recipients. Notifications table 408 contains multiple records, each record corresponding to a pair of a surveillance domain producing an alert and a client (or client group) authorized to receive the alert notification. Authorization to receive the notification is granted in the first instance by the surveillance domain. In the preferred embodiment, the surveillance domain can specify unconditional authorization of a client to receive notifications, or authorization conditioned on one or more events. These events could be scheduled events (e.g., a time of day, day or week and/or range of dates), or unscheduled events (e.g., a fire, an intrusion into a monitored area, etc.). For example, a building owner or tenant of an area covered by a surveillance domain may wish to see all alerts generated by the domain (unconditional notification), while notification to selective others is restricted to particular times and/or conditions (for example, a police department receiving alert notification or a perimeter intrusion only at times when nobody should be on the premises), and notification to the general public is not provided at all.

Figure 10:
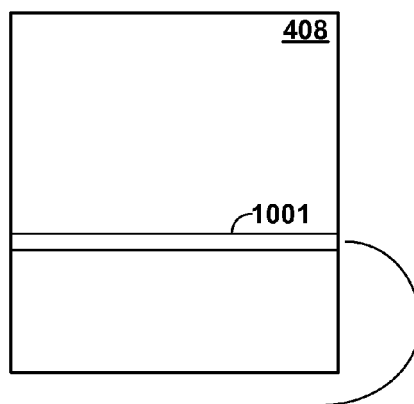
FIG. 10 is a conceptual illustration of an alert notifications table in a video broker database, according to the preferred embodiment.

FIG. 10 is a conceptual illustration showing in greater detail an alert notifications table 408 in a video broker database 404, according to the preferred embodiment. Each record 1001 in notifications table 408 contains a corresponding surveillance domain ID 1002 of the source surveillance domain of the alert; a recipient ID 1003 of the of the client or client group to which notification is to be sent; an alert type 1004 of the applicable alert; a start date/time 1005 and end date/time 1006 of a time window within which the alert must be received; a set of day of week flags 1007 for alert time windows which recur on a weekly basis, and a daily start time 1008 and daily end time 1009 for the time windows which recur on a weekly basis; and such additional conditions as may be deemed desirable. In any of these fields (except the surveillance domain ID), a null or other appropriate value can be used to designate a "wild card", meaning that any value of the corresponding field will satisfy the filter parameters. The parameters specified by the field values are logically ANDed, so that all parameters must be satisfied in order for the alert notification to be authorized for the recipient client or client group. Multiple records on behalf of a single requestor may be placed in notifications table 408 to address logical OR conditions.

Alert filters table 409 contains multiple records, each record corresponding to a set of parameters of a requested alert notification to be provided by broker 103. In the preferred embodiment, clients have the ability to filter the alerts for which they will receive notification. This is of particular benefit to large, public entities, such as a local police department, which might otherwise be inundated with automatically generated alert notifications. It might further be used to direct alerts to a specific individual within a large organization. For example, a surveillance domain may authorize the sending of alerts to a client group (such as a police department), not knowing the identity of the individual to handle alerts. The police department could then use the filter to prevent alert notifications from being sent to each and every member of the department, and to permit the notification to reach a single individual (or very select number of individuals). A client (or a client acting on behalf of a client group) therefore specifies filter parameters for alerts it is to receive, each record in filters table 409 corresponding to a single client (or a client group) and types of alerts to be received.

Figure 11:
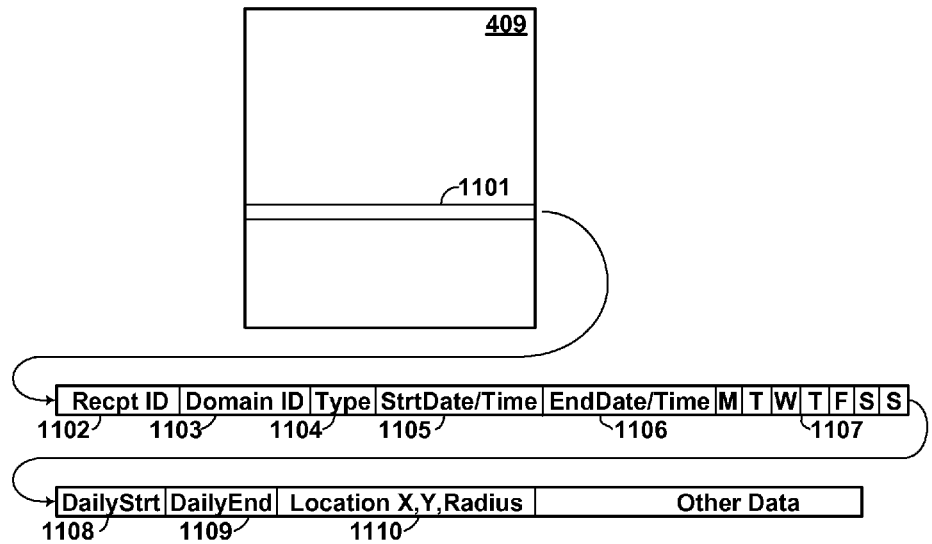
FIG. 11 is a conceptual illustration of an alert filters table in a video broker database, according to the preferred embodiment.

FIG. 11 is a conceptual illustration showing in greater detail an alert filters table 409 in a video broker database 404, according to the preferred embodiment. Each record 1101 in filters table 409 contains a corresponding recipient ID 1102 of the client or group to which the notification parameters applies; a source ID 1103 specifying a source surveillance domain to which the filter applies (i.e., the filter record applies to alerts generated by the corresponding source surveillance domain); an alert type 1104 of the applicable alert; a start date/time 1105 and end date/time 1106 of a time window within which the alert must be received; a set of day of week flags 1107 for alert time windows which recur on a weekly basis, and a daily start time 1108 and daily end time 1109 for the time windows which recur on a weekly basis; an alert source location area 1110; specifying a location within which the alert must be generated; and such additional conditions as may be deemed desirable. The parameters specified by the field values are logically ANDed, ("wild card" values being possible where appropriate), so that all parameters must be satisfied in order for the alert notification to be sent to the requestor. Multiple records on behalf of a single requestor may be placed in filters table 409 to address logical OR conditions.

Video authorizations table 406 contains records of outstanding conditional and unconditional authorizations to access video produced from surveillance domains 102. Each record in authorizations table 406 corresponds to a pair of a surveillance domain producing video data and a client (or client group) authorized to receive the video data, the authorization to receive the video data being granted in the first instance by the surveillance domain. The surveillance domain can specify unconditional authorization of a client to receive video data, or authorization conditioned on one or more events. As in the case of alert notifications, these events could be scheduled events (e.g., a time of day, day or week and/or range of dates), or unscheduled events (e.g., a fire, an intrusion into a monitored area, etc.).

Figure 12:
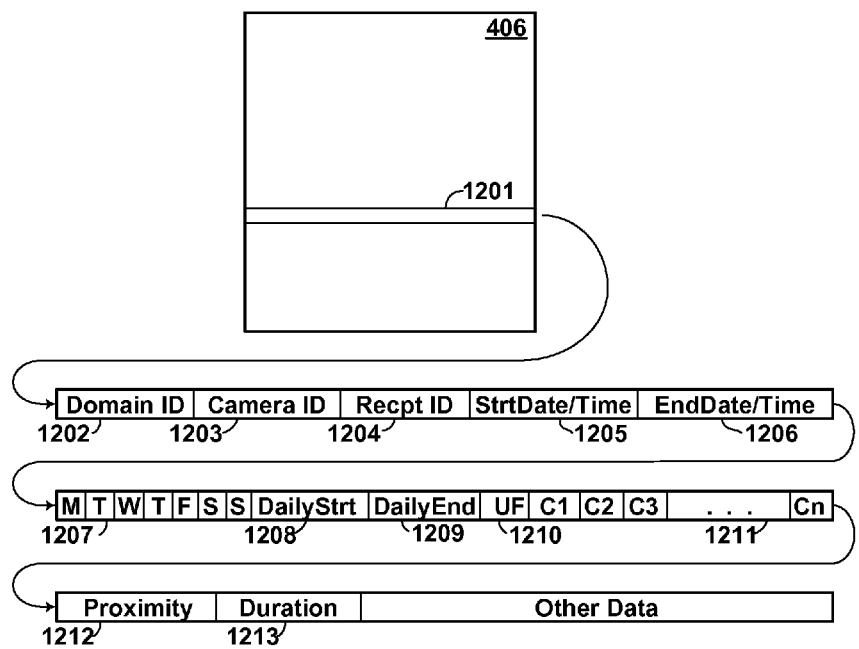
FIG. 12 is a conceptual illustration of a video authorizations table in a video broker database, according to the preferred embodiment.

FIG. 12 is a conceptual illustration showing in greater detail a video authorizations table 406 in a video broker database 404, according to the preferred embodiment. Each record 1201 in authorizations table 406 contains a corresponding domain ID 1202 of the source surveillance domain of the video to be authorized; a camera ID 1203 containing the identifier of a camera or camera group within the source surveillance domain to which the authorization is limited; a recipient ID 1204 of the of the client or client group authorized to receive the video; and multiple fields specifying conditions, if any, under which the recipient is authorized to receive the video. It is expected that most authorizations will grant authority to view video from any camera within the surveillance domain, in which case an appropriate "wild card" value will be used in camera ID field 1203. However, there may be circumstances in which it is desirable to grant access to video from a single camera or group of cameras within the domain. For example, a large business may have areas of varying sensitivity, from outdoors areas such as grounds and parking lot which are visible to the general public at all times, to semi-public areas such as lobby, to ordinary work areas such as offices, laboratory, or manufacturing area which are not normally open to the public, to areas of extreme sensitivity where important company matters and secrets may be kept or discussed. In such cases, it may be desirable to grant access to different cameras within the surveillance domain under different circumstances.

The conditions for granting video access authority could include any of various scheduled or non-scheduled events, the conditions fields specifying, e.g., one or more sensor-generated alert events; a start date and end date of a time window within which video access is authorized; a start time, end time and day(s) of week of time periods which are scheduled to repeat on a weekly basis, during which access is authorized; a client location area condition requiring that the receiving client be within a specified area; and/or other conditions. In the exemplary video authorizations table of FIG. 12, fields 1205-1209 specify scheduled events, i.e., a start date/time 1205 and end date/time 1206 of a time window within which video access is authorized; a set of day of week flags 1207 for access authorization time windows which recur on a weekly basis, and a daily start time 1208 and daily end time 1209 for the time windows which recur on a weekly basis. Fields 1210-1213 specify non-scheduled event conditions which may cause access to be authorized. Unconditional flag 1210 is set to indicate that there are no non-scheduled event conditions on the granting of access, i.e., access is granted regardless of the state of event alerts (although it may still be restricted to scheduled times). If unconditional flag 1210 is not set, then condition flags C1 . . . Cn 1211 indicate which conditions will cause access to be authorized. The conditions corresponding to the various flags C1 . . . Cn could be any of the conditions previously mentioned, i.e., sensor generated alarms, location proximity of a client, etc. One of the conditions is a locational proximity condition, in which the client is granted access if within a certain locational proximity (preferably expressed as a distance) from the surveillance domain. Proximity field 1212 expresses the required proximity for granting access. Condition data may include one or more duration fields 1213 (of which one is shown) for access authorizations granted as a result of a non-scheduled event, i.e., the duration field specifies that access is available beginning with the time of the non-scheduled event and ending after the time duration specified in the duration field has elapsed. Although not shown in FIG. 12, there could be separate duration fields for each type of event. The parameters specified by the field values are logically ANDed ("wild card" values being possible where appropriate), so that all parameters must be satisfied in order for video access to be authorized for the recipient client or client group. Multiple records may be used in authorizations table 406 to address logical OR conditions.

In particular, in accordance with one or more preferred embodiments, at least one condition specified by condition flags C1 . . . Cn 1210 corresponds to a "declared emergency" condition. A "declared emergency" condition is an emergency declared by an appropriate public authority, such as a police department, fire department, emergency response agency, and so forth. An owner or other person in control of a private surveillance domain can pre-authorize persons to access surveillance video upon the declaration of such an emergency, without the need to obtain permission when time may be critical, by setting the appropriate condition flag for the "declared emergency" condition. There could be multiple different types of declared emergency which are independently set to grant video authorization.

While it would be possible to grant authorization to receive video data to exactly the same clients or client groups and under exactly the same conditions as authorization to receive alert notifications (and thus use a single table of authorizations rather than a separate video authorizations and alert notifications table), in the preferred embodiment the two forms of authorization are granted independently. There are various instances in which the capability to independently grant authorization to view video and authorization to receive alerts might be useful. For example, if the camera is in an area which is open to the general public (a parking lot, a courtyard, etc.) the authorization to access the video might be very broad (even to include the general public), but it would be undesirable to send alert notifications to such a broad set of clients. As another example, in some instances privacy concerns may be so strong that the access rights to the video are extremely limited even when an alert notification is provided. For example, an alert concerning an unauthorized intruder in a highly sensitive area might be sent to a police department (i.e., a client group), but authorization to the video might be limited to those officers who actually respond, in this case providing the video to a portable client device only when the location of the responding officers is within some sufficiently close distance of the site.

Figure 13:
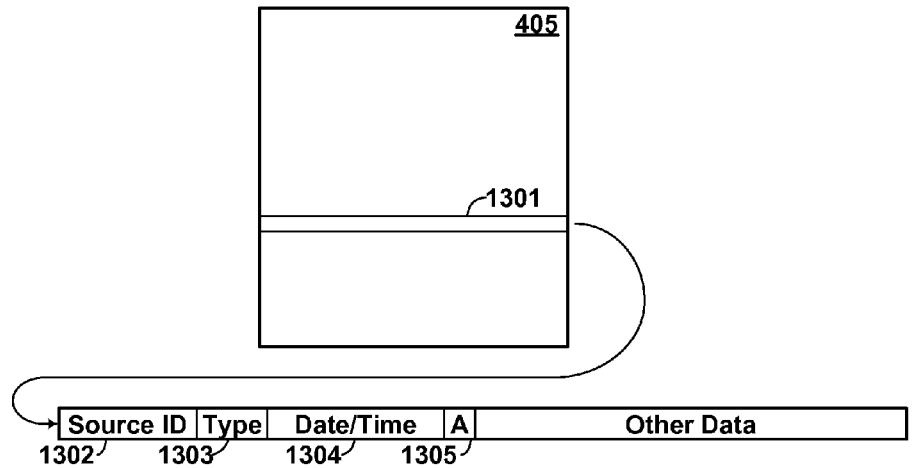
FIG. 13 is a conceptual illustration of an events table in a video broker database, according to the preferred embodiment.

Events table 405 contains records of non-scheduled events which have occurred and which may be the basis for sending alert notifications and/or authorizing access to video, each record in events table 405 corresponding to a single detected event. FIG. 13 is a conceptual illustration showing in greater detail an events table 405 in a video broker database 404, according to the preferred embodiment. Each record 1301 in events table 405 contains a source ID 1302 specifying the source of the event, i.e. the surveillance domain ID or client ID of the surveillance domain or client, as the case may be, which originated the event; an event type 1303; a date and time of the event 1304; an "active" flag 1305 indicating whether the event is still considered "active", i.e. access may be granted based on the event; and such other information as may be useful to characterize the event. Preferably, events are manually deactivated by the originator, and thereafter can not serve as a basis for granting access to video. Deactivated events may be stored in a separate partition of events table to reduce the size of the table when searching for active events.

Figure 14:
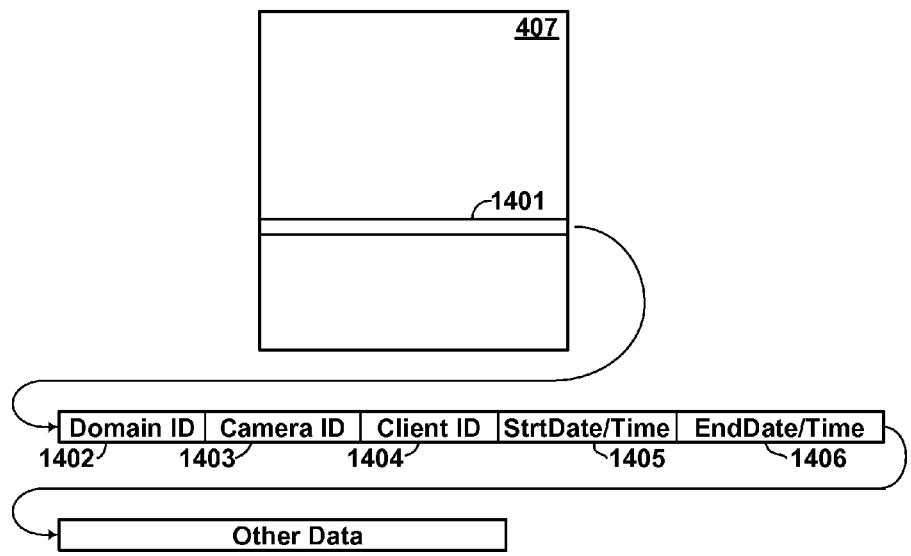
FIG. 14 is a conceptual illustration of a video accesses table in a video broker database, according to the preferred embodiment.

Video accesses table 407 is intended as a log of video access authorizations which have been granted by broker 103. FIG. 14 is a conceptual illustration showing in greater detail a video accesses table 407 in a video broker database 404, according to the preferred embodiment. Each record 1401 in video accesses table 407 records a single instance of video access authorization granted to a single client, and contains a surveillance domain ID 1402 to which access was granted; a camera ID 1403 of a camera (or camera group) to which access was granted; a client ID 1404 of the client granted access; a date and time the access was granted 1405; a date and time the access ended 1406; and such other information with respect to the access as may be useful. Although an entire client group may be authorized to obtain access to selective video, each individual client granted access is recorded as a separate entry in accesses table 407. Accesses table 407 provides a record, which can be searched using standard database search techniques, of all past accesses, and is important as a tracking and auditing vehicle to ensure that accesses are appropriately granted. It is noted that in one or more embodiments herein, a party other than the owner of the surveillance domain may grant access. In particular, a public agency emergency services provider (fire, police, medical emergency responder, etc.) may declare an emergency and thereby obtain access to video, without pre-authorization of the surveillance domain owner. The primary safeguard against abuse of this capability is the audit trail provided by accesses table 407.

In the above descriptions, a location or location area is preferably specified as a set of global positioning coordinates corresponding to a location (if the location is intended to be a specific point, such as the location of a camera), and as a set of global positioning coordinates corresponding to a location center and a radius from the center (if the location is intended to be an area or region which is matched to a point, such as the location of an area or region specified in a filter). It will be appreciated that other techniques could be used to specify a location, such as quadrants or grid locations on a city map. Additionally, location may be provided in multiple formats, such as a set of global positioning coordinates which is used for automatic matching of location information in the database, and an accompanying natural language description (such as a street address, floor, wing or room of a building) which is more readily understandable to a human user. If the location applies to a mobile device (such as a mobile surveillance domain or mobile client), the location may be periodically updated to provide reasonably current location data.

Video broker database manager 420 is executable computer programming code which executes on CPU 301 to provide basic functions for the management of database 403. Database manager 420 may theoretically support an arbitrary number of database tables, which may or may not have related information, a specific number and structure of tables being shown in FIG. 4. Database manager 420 preferably contains administrative functions 421 allowing users to perform basic administrative operations with respect to the database, such as defining and editing database table definitions, creating, editing and removing records in the database, viewing records in the database, defining database auxiliary data structures such as indexes and materialized query tables, and so forth. In general, it is expected that these administrative functions would be performed by employees or contractors of the broker 103. Database manager 420 preferably further includes a query engine 422 for executing queries against data in database tables 405-414. Database management system further preferably includes an external interface 423 having one or more application programming interfaces (APIs) by which external applications can access data in video broker data 404 either by invoking query engine 422 or through other means. Database management system 420 may further contain any of various more advanced database functions, as are known in the art. In the preferred embodiment, database manager 420 is a generic database management system implementing a structured query language (SQL) query protocol, it being understood that a database manager might alternatively query and structure data according to some other protocol and/or that it might be a custom designed database management system. Although database manager 420 is represented in FIG. 4 as an entity separate from operating system kernel 401, it will be understood that in some computer architectures various database management functions are integrated with the operating system.

Although one database 403 having ten database tables 405-414 and three auxiliary structures 415-417 are shown in FIG. 4, the number of such entities may vary, and could be much larger. Additionally, database 403 may be logically part of a larger distributed database which is stored on multiple computer systems. Although database manager 420 is represented in FIG. 4 as part of database 403, the database manager, being executable code, is sometimes considered an entity separate from the "database", i.e., the data.

Memory 302 of a computer system 300 configured as a video broker 103 further includes video broker controller 430. Video broker controller 430 is a set of computer programs or functions (i.e., executable computer programming code which execute on CPU 301) providing basic functions for the operation of broker and accessing of data in database 403 needed to perform broker operations. In particular, the video broker controller includes a registration function 431, a surveillance domain (SD) service function 432 which includes an alert notifications handler 433, and a client service function 434 which includes a video authorization function 435.

Registration function 431 is used for registering clients and surveillance domains to video broker 103, and may also be used for initial input of relevant profile data defining the clients and surveillance domains and stored in various files of database 403.

SD Service function 432 provides service to registered surveillance domains, which in particular includes editing of profile and authorization information such as stored in any of surveillance domains table 412, cameras table 411, alert notifications table 412, and/or video authorizations table 414, and the receipt and handling of alert notifications. Alert notifications handler 433 handles the generation and transmission of appropriate alert notifications responsive to detected events. Alert notifications handler accesses appropriate records in database 403 to determine the identity of clients to receive notification of each event, determines the appropriate filtering parameters and method of notification, and generates and transmits one or more alert notifications as required to each client entitled to notification.

Client Service function 434 provides service to registered client devices which access broker 103. This service includes: editing of profile, group and filter information stored in any of clients table 410, client groups table 414, group membership table 413 and/or filters table 413; search and discovery of surveillance domains using information in database 403; declaration of emergency state; searching the log of video accesses in accesses table 407; and granting access to surveillance video in accordance with previously specified access parameters. Video access function 435 handles the grant of access to certain video responsive to requests from clients. Video access function receives each client request to access designated video, accesses appropriate records in database 403 to verify authority to access the requested video, determines whether access is authorized, and if so grants access rights to the requesting client and logs the access.

In addition to database management system 410 and video broker controller 430, one or more user applications (not shown) may access data in database 403 to perform tasks on behalf of one or more users, and may use defined auxiliary database structures to do so. Such user applications may execute on computer system 300, or may access the database from remote systems. Such user applications may include, e.g., accounting applications which allocate charges for services provided; audit and security applications which monitor events and accesses; administrative applications which maintain the video broker system; or any of various other applications which may have use for the data.

Various software entities are represented in FIG. 4 as being separate entities or contained within other entities. However, it will be understood that this representation is for illustrative purposes only, and that particular modules or data entities could be separate entities, or part of a common module or package of modules. Furthermore, although a certain number and type of software entities are shown in the conceptual representation of FIG. 4, it will be understood that the actual number of such entities may vary, and in particular, that in a complex database environment, the number and complexity of such entities is typically much larger. Additionally, although software components 403-417, 420-423, and 430-435 are depicted in FIG. 4 on a single computer system 300 for completeness of the representation, it is not necessarily true that all programs, functions and data will be present on a single computer system or will be performed on a single computer system. In particular, video broker controller 430 and/or associated data or functions could be located on a system separate from broker database 403, the data in broker database 403 being accessed remotely by functions within video broker controller 430.

While the software components of FIG. 4 are shown conceptually as residing in memory 302, it will be understood that in general the memory of a computer system will be too small to hold all programs and data simultaneously, and that information is typically stored in data storage devices 325-327, comprising one or more mass storage devices such as rotating magnetic disk drives, and that the information is paged into memory by the operating system kernel 401 as required. In particular, database tables 405-414 are typically much too large to be loaded into memory, and typically only a small portion of the total number of database records is loaded into memory at any one time. The full database 403 is typically recorded in disk storage 325-327. Furthermore, it will be understood that the conceptual representation of FIG. 4 is not meant to imply any particular memory organizational model, and that system 300 might employ a single address space virtual memory, or might employ multiple virtual address spaces which overlap.

In accordance with the preferred embodiment, surveillance video broker 103 connected to network 101 serves as a clearinghouse for accessing video surveillance data produced by surveillance domains 102 by clients 104 and forwarding alerts to clients 104. Both surveillance domains and clients independently register with surveillance video broker 103 for use of its services, providing such information as may be required. Once registered, surveillance domains may thereafter send alert notifications to the surveillance video broker for transmission to one or more clients. Clients may access the surveillance video broker for any of various services, but in particular to gain access to surveillance video produce by a surveillance domain.

Registration may use any of various known techniques for verifying the identity of the registering surveillance domain or client, and assigning security protection mechanisms to the relationship. Part of the registration process may be manually-assisted, but at some point essential registration information is entered into surveillance video broker 103 and stored in its database 403. For example, an on-line registration request providing essential information could be verified by mail confirmation to a street address or in-person confirmation. Preferably, at a minimum, a registering surveillance domain or client would be assigned a user identifier and password for accessing broker 103 over network 101. Additional security mechanisms could be provided for access and/or protection of information, such as challenge questions, encryption keys for encrypting sensitive data, etc.

When a surveillance domain registers with the surveillance video broker 103, it provides the information stored in the corresponding entry 801 for that surveillance domain in surveillance domains table 412. This information is described above with respect to FIG. 8. The surveillance domain further provides information for a corresponding entry 901 in cameras table 411 for each camera within the surveillance domain. This information is described above with respect to FIG. 9. The surveillance domain further optionally provides information for one or more notification requests, each request being stored in a corresponding entry 1001 in notifications table 408, and directing broker 103 to notify a respective client or client group upon the occurrence of specified events. This information is described above with respect to FIG. 10. The surveillance domain further optionally provides information for one or more video access authorizations, each video access authorization being stored in a corresponding entry 1201 in video authorizations table 406, and directing broker 103 to grant video access to a respective client or client group under specified conditions. This information is described above with respect to FIG. 12.

Similarly, a client registers with the surveillance video broker 103 and provides the information stored in the corresponding entry 501 for that client in clients table 410. This information is described above with respect to FIG. 5. The client further optionally provides information for one or more notification filter entries 1101 in filters table 409, each filter entry specifying conditions under which an applicable alert notification is to be transmitted to the client. This information is described above with respect to FIG. 11.

The relevant information may be provided by the surveillance domain or client at the time of registration or thereafter. Typically, notification requests, notification filters, and video access authorizations are updated from time to time, and therefore the surveillance domain or client is able to log into broker 103 and alter previously submitted data or provide new data. Thus, in the case of video access authorizations or notification requests, the surveillance domain maintains complete control of the outstanding authorizations to access its video as well as the notification requests, and can change these at any time. The client (or client group) maintains complete control of its notification filters. The data may be provided by manual entry (e.g., by entering data in an on-line interactive screen), or automatically by use of a computer program which gathers the data and uploads it to the broker, or by a combination of manual and automated means. For example, broker 103 may provide downloadable computer programs for certain popular operating systems which gather configuration data from the surveillance domain or client and upload it. Data such as global positioning coordinates, video protocols and bandwidth, camera control data, and so forth, may be automatically accessible and readily gathered by an appropriate automated program, to reduce possible error in manual entry. Even where automated programs exist to upload certain configuration data, it is likely that video access authorizations, notification requests and notification filters will be manually specified.

Once registered, the surveillance domain remotely logs in to broker 103 to utilize its services. The surveillance domain is logged in to change its profile data, change the alert notifications or video access authorizations, or to transmit an alert to the broker. Preferably, the surveillance domain is continuously logged in for relatively long periods of time while the services of broker 103 are utilized to send notifications or facilitate access to surveillance video, but depending on the implementation, it could alternatively log in only intermittently when it desires service from the broker. The mechanism for surveillance video access may, but need not necessarily, require that the surveillance domain be logged in to the broker in order for a client to access its video, as discussed in greater detail herein. Where the surveillance domain is required to be logged in for video access and log in is intermittent, the broker will send a message to the surveillance domain using any appropriate mechanism requesting it to log in in the event that a client requests access to the surveillance domain's video.

Figure 15:
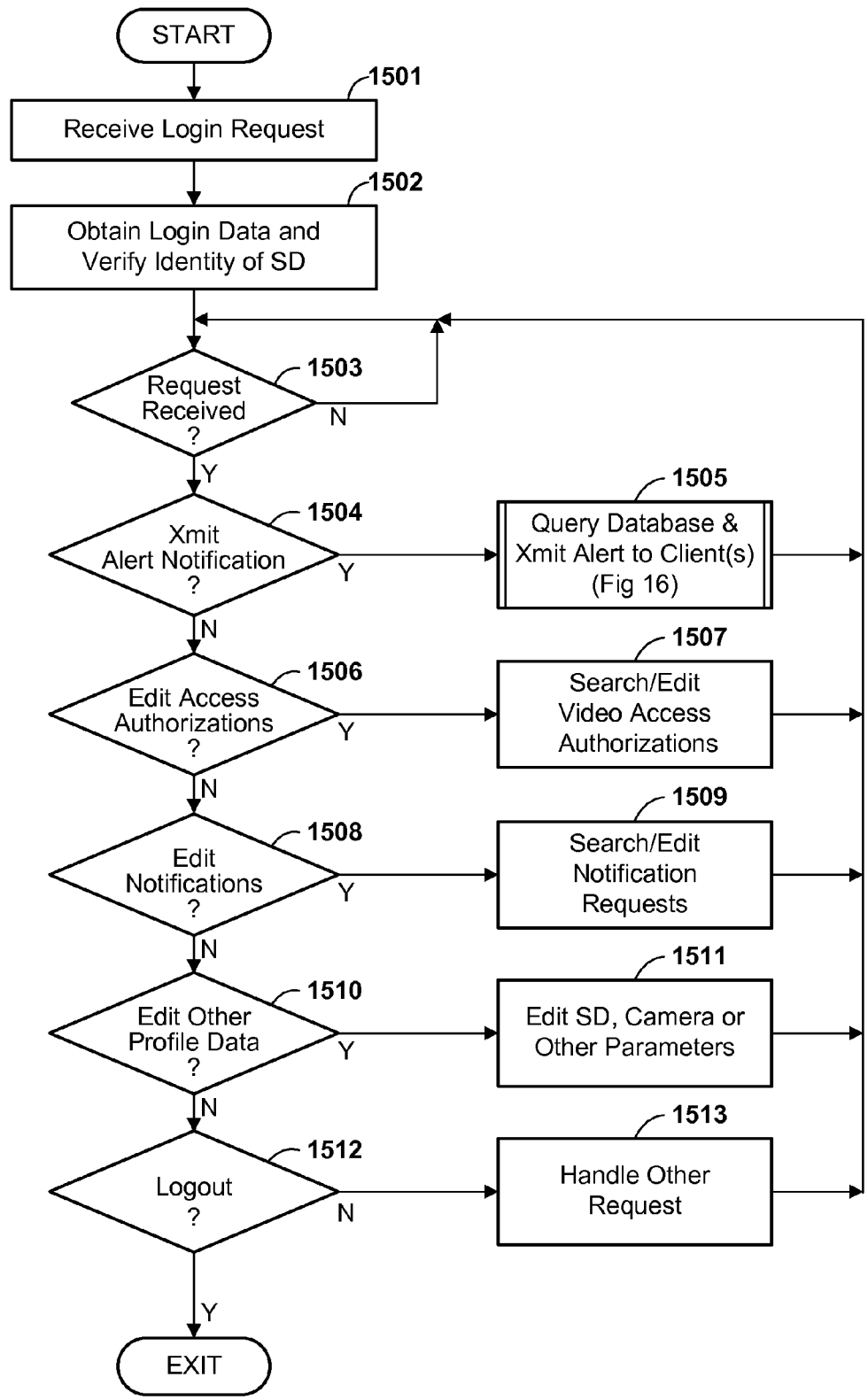
FIG. 15 is a flow diagram illustrating at a high level the operation of a surveillance domain service function executing in a surveillance video broker, according to the preferred embodiment.

FIG. 15 is a flow diagram illustrating at a high level the operation of SD service function 432 executing in surveillance video broker 103, and providing service to a requesting surveillance domain 102 connected over network 101, according to the preferred embodiment. Referring to FIG. 15, a previously registered surveillance domain 102 issues a login request, which is received by broker 103 (block 1501).

The broker responds by soliciting the necessary data to verify the identity of the surveillance domain, and using the data provided to verify the domain's identity (block 1502). Identity of the surveillance domain is preferably verified at login time by soliciting a user ID and password from the surveillance domain. For greater security, other and/or additional forms of identity verification could be used, for example, challenge questions could be asked, or randomly generated challenge data could be sent for encryption or decryption by the surveillance domain using a key of a public/private key pair, as is known in the art. The data provided by the surveillance domain might be manually entered or automatically provided (e.g., from stored data). In particular, where the surveillance domain logs in only intermittently, login information would typically be automatically provided to facilitate the automatic transmission of alert notifications.

Once the identity of the surveillance domain is verified, the domain is logged on to the broker and the broker waits for an incoming service request from the surveillance domain, represented as the tight loop at block 1503. There could be a very considerable time delay between log in and the submission of a request. The representation of a delay loop at block 1503 is not meant to imply that the SD service function 432 is continually executing during this period, but as is well known, the SD service function may be placed in an idle state by OS kernel 401 while awaiting an incoming request to allow other processes to execute in processor 301. Upon receipt of a request, the request is processed, represented as the 'Y' path from block 1503.

Figure 16:
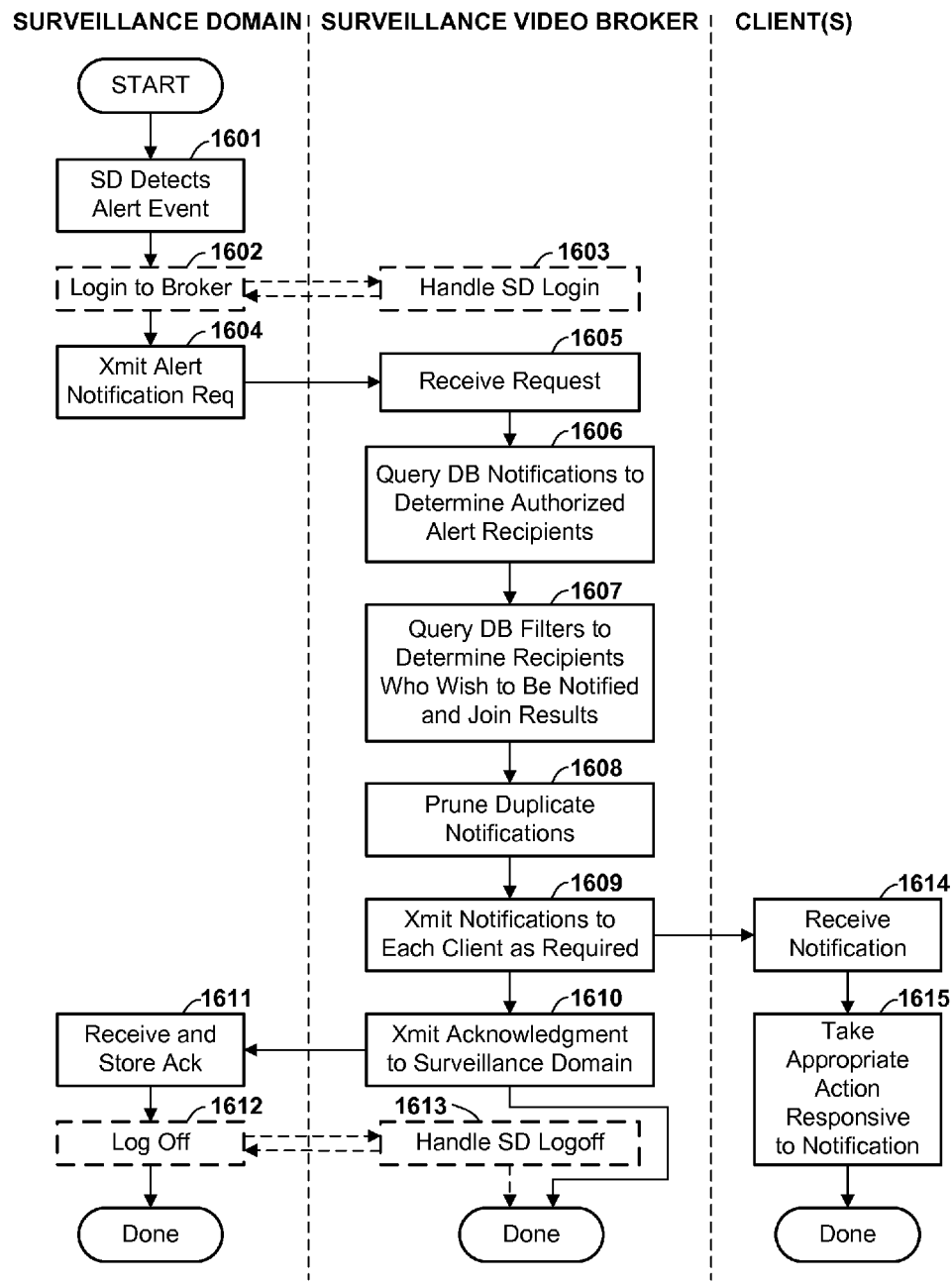
FIG. 16 is a flow diagram illustrating in greater detail a process for handling an alert notification request, according to the preferred embodiment.

If the request is a request to transmit an alert notification, the 'Y' branch is taken from block 1504, and the alert notification is processed by querying the database to determine which clients should receive notification, and generating and transmitting the appropriate alert notifications to clients (represented in FIG. 15 as block 1505, and shown in greater detail in FIG. 16). After servicing the request, control returns to block 1503 to await the next request. In the preferred embodiment, an alert notification is a form of service request from the surveillance domain to the broker, and therefore the surveillance domain is logged in to the broker in order to make the request, thus assuring that the surveillance domain's identity has been verified and the possibility of false alerts minimized. It would alternatively be possible to provide alert notifications to the broker by other means which do not require login, such as instant messaging, e-mail or telephonic transmission, but in those cases some alternative provision should be made for verifying the identity of the source of the alert.

FIG. 16 is a flow diagram illustrating in greater detail a process for handling an alert notification request, according to the preferred embodiment. In the representation of FIG. 16, actions performed by a surveillance domain 102 requesting alert notification are shown in the left column, while actions performed by surveillance video broker 103 are shown in the middle column, and actions performed by a client receiving a notification are shown in the right column.

Referring to FIG. 16, a previously registered surveillance domain 102 detects an unscheduled alert event for which there is cause to send an alert notification (block 1601). The alert event might be any of various events detected by any of sensors 204, including sensors not represented in any of FIGS. 2A, 2B, or described in connection therewith. By way of illustration and not limitation, an alert event may include any or all of: a perimeter intrusion detected by a perimeter sensor; motion within a defined area detected by a motion detector; a potential fire detected by a smoke and/or heat sensor, intrusion in an area detected by an auditory sensor, glass breakage (e.g. window) detected by auditory, contact film or other glass breakage sensors; extreme high or low temperature conditions detected by temperature sensors; gas leakage detected by sensors which detect a gas presence or leakage from an enclosed vessel, such as a pressure sensor; water leakage or penetration detected by appropriate sensors, chemical spill detected by appropriate chemical, pressure or weight sensors, excessive radiation detected by radiation sensors; and so forth. An alert event might further include any of various manually-tripped alarms, such as well-known manually operated fire alarms, bank teller or store clerk alarms, and the like. An alert event might further include any malfunction of surveillance domain equipment, which may be an indication of unauthorized tampering, or simply an item requiring maintenance. Where the surveillance domain is a mobile surveillance domain, an alert event might further include any or all of: the domain equipment (e.g. a motor vehicle) venturing outside a pre-defined area, as detected by a global positioning device; the domain equipment exceeding a pre-determined speed; the domain equipment experiencing a collision, etc. An alert event might further be a condition which is detected from video analysis of the surveillance video itself. For example, analysis may detect the presence of an intruder in an area under surveillance or some other condition requiring and alert.

If the surveillance domain 102 is not logged in to broker 103 when the alert condition is detected (e.g., login is intermittent rather than continuous), the surveillance domain logs in to broker 103, generally requiring an exchange of login data for verification purposes. This is represented in FIG. 16 as optional blocks 1602 and 1603. Preferably, the surveillance domain stores the necessary login data and automatically logs in to the broker, without requiring manual data entry from an operator.

The surveillance domain then transmits an alert notification request to broker 103 over network 101 (block 1604). The alert notification request includes any necessary parameters of the alert, e.g., an alert type, a location or other identification of a sensor which detected the condition, and so forth. The alert notification is received by the broker (block 1605).

Upon receipt of the request, alert notifications handler 433 executing in broker 103 queries database 403 to determine those clients who are authorized to receive notification of the alert (block 1606). A client authorized to receive alert notification is one who is either (a) identified as a recipient, or (b) a member of a client group identified as a recipient, in the recipient ID field 1003 of an entry 1001 in alert notifications table 408 which matches the parameters of the received alert notification request. This can be determined using standard database query techniques. For example, a query of the form:

```
FIND clientID in ClientsTable
    WHERE clientID = NotificationsTable.recptID AND
    [domain ID of requestor] = NotificationsTable.domainID AND
    [type of alert] matches NotificationsTable.type AND
    [other alert parameters] match NotificationsTable.[other
    parameters]
``` would return clients directly identified as recipients, and a query of the form:

```
FIND clientID in ClientsTable
    WHERE clientID = GrpMembTable.clientID AND
    GrpMembTable.groupID = NotificationsTable.recptID AND
    [domainID of requestor] = NotificationsTable.domainID AND
    [type of alert] matches NotificationsTable.type AND
    [other alert parameters] match NotificationsTable.[other
    parameters]
``` would return clients who are members of a group identified as a recipient.

The alert notifications handler 433 further filters the authorized clients as determined above to determine those authorized clients who actually wish to receive notification (block 1607). Again, this can be done using standard database query techniques. For example, a query of the form:

---
FIND clientID in [results from block 1606]
   WHERE clientID = FiltersTable.recptID AND
     [domainID of requestor] matches FiltersTable.domainID
     [type of alert] matches FiltersTable.type
     [other alert parameters] match FiltersTable.[other parameters]

--- would return clients directly identified as recipients recipientID field 1102 of a corresponding entry 1101 in filters table 409, and a query of the form:

---
FIND clientID in [results from block 1606]
   WHERE clientID = GrpMembTable.clientID AND
     GrpMembTable.groupID = FiltersTable.recptID AND
     [domainID of requestor] matches FiltersTable.domainID
     [type of alert] matches FiltersTable.type
     [other alert parameters] match FiltersTable.[other parameters]

--- would return clients who are members of a group identified as a recipient.

The resulting list of clients to receive notification is pruned if necessary to remove any duplicates (block 1608). While blocks 1606-1608 have been illustrated and described herein as separate, sequential operations, it will be appreciated by those skilled in the art of database design and queries that various query conditions expressed herein might be combined or performed in different order for purposes of efficiency, and that database tables and or auxiliary structures might be partitioned, indexed or otherwise constructed to efficiently support extraction of the information explained herein.

Having determined the clients to receive notification of the alert, alert notifications handler 432 generates the appropriate alert notification(s) to each client and causes them to be transmitted (block 1609). Alert notification may be transmitted by any of various means, including e-mail, voice message, text message and/or instant message, as previously specified for each client in the client's record 501 in clients table 410. A client may specify multiple forms of notification to increase the probability of timely receipt.

The alert notifications handler 432 further generates an acknowledgment message back to the requesting surveillance domain and causes the message to be transmitted to the surveillance domain (block 1610). The surveillance domain receives and stores the acknowledgment message (block 1611). Generally, no further action is required by the surveillance domain. If the surveillance domain is not continuously logged in to the broker, the surveillance domain will then log off (blocks 1612 and 1613).

On the client side, a client device may receive a notification (block 1614), and take appropriate action in response (block 1615). Generally, appropriate action will be to bring it to the attention of a human user, as by display of alert data or selectable icon representing the alert, an audible sound indicating the presence of an incoming message, and so forth. Typically, the human user will then make a determination as to appropriate further action. However, a client device may in appropriate situations also take some automatic action. For example, a client device could automatically request authorization to surveillance video responsive to an alert and display the surveillance video to a user, thus removing the need for the user to manually request authorization in order to further investigate the alert.

Referring again to FIG. 15, if the incoming request from the surveillance domain is something other than an alert notification request, the 'N' branch from block 1504 is taken.

A surveillance domain may request to add, delete or otherwise edit authorizations to access surveillance video produced by it, represented as the 'Y' branch from block 1506. In this case, SD service function 432 presents one or more interactive selection and editing screens to a user in the surveillance domain allowing the user to search for a previous authorization (stored in video authorizations table 406), edit or delete a previous authorization when found, and/or generate a new authorization (block 1507). This may be accomplished, e.g., by presenting one or more interactive web pages to a user executing a browser application within surveillance domain local controller 202. Any changes are stored in one or more appropriate entries in video authorizations table 406, and the SD service function returns to the idle loop at block 1503.

If the incoming request is neither an alert notification request nor a request to edit access authorizations (the 'N' branch from block 1506), a surveillance domain may further request to add, delete or otherwise edit alert notification records for alerts generated by it, represented as the 'Y' branch from block 1508. In this case, the SD service function presents one or more interactive selection and editing screens to a surveillance domain user allowing the user to search for a previous notification record (stored in notifications table 408), edit or delete a previous notification record when found, and/or generate a new notification record (block 1509). This may be accomplished, e.g., by presenting one or more interactive web pages to a user executing a browser application within surveillance domain local controller 202. Any changes are stored in one or more appropriate entries in notifications table 408, and the SD service function returns to the idle loop at block 1503.

If the incoming request is neither an alert notification request nor a request to edit access authorizations nor a request to edit notification records (the 'N' branch from block 1508), a surveillance domain may further request to edit other profile data, such as data defining the parameters of the surveillance domain or its cameras, represented as the 'Y' branch from block 1510. In this case, the SD service function may present one or more interactive selection and editing screens to a surveillance domain user allowing the user to edit the desired information, e.g., by presenting interactive web pages to a user executing a browser application within surveillance domain local controller 202 (block 1511). Alternatively, block 1511 may represent certain information provided or edited by an automated program executing in a surveillance domain. For example, in the case of a mobile surveillance domain, it may be desirable to periodically update the location of the surveillance domain. It would be inconvenient and error prone for a user to do this manually, but a surveillance domain local controller could be programmed to automatically provide such information to the broker via a series of requests, either at pre-determined intervals or when a current location becomes sufficiently distant from a previously supplied location. Any changes are stored in appropriate location(s) in database 403, and the SD service function returns to the idle loop at block 1503.

If the incoming request is neither an alert notification request nor a request to edit access authorizations nor a request to edit notification records nor a request to edit other profile data (the 'N' branch from block 1510), a surveillance domain may further request other services (not including logout), represented as the 'N' branch from block 1512. In this case, the SD service function handles the request as appropriate (block 1513). Other request may include, e.g., requests for maintenance and diagnostic services, accounting and billing matters, or any other service which might be useful. After servicing the request, the SD service function returns to the idle loop at block 1503. If the request is a logout request (the 'Y' branch from block 1512), the SD service function terminates and the surveillance domain is logged out.

Client services function 434 executing in broker 103 similarly handles requests for service from clients 104. Once a client is registered, the client remotely logs in to broker 103 to utilize its services. Services provided by the broker to the client include: obtaining video access authorization to access surveillance video produced by a surveillance domain; searching for available surveillance domains; changing notification filters parameters, or other client profile data; defining membership in a client group; declaring an emergency condition to enable controlled video access; and/or examining records of past events or video accesses.

Figure 17A:
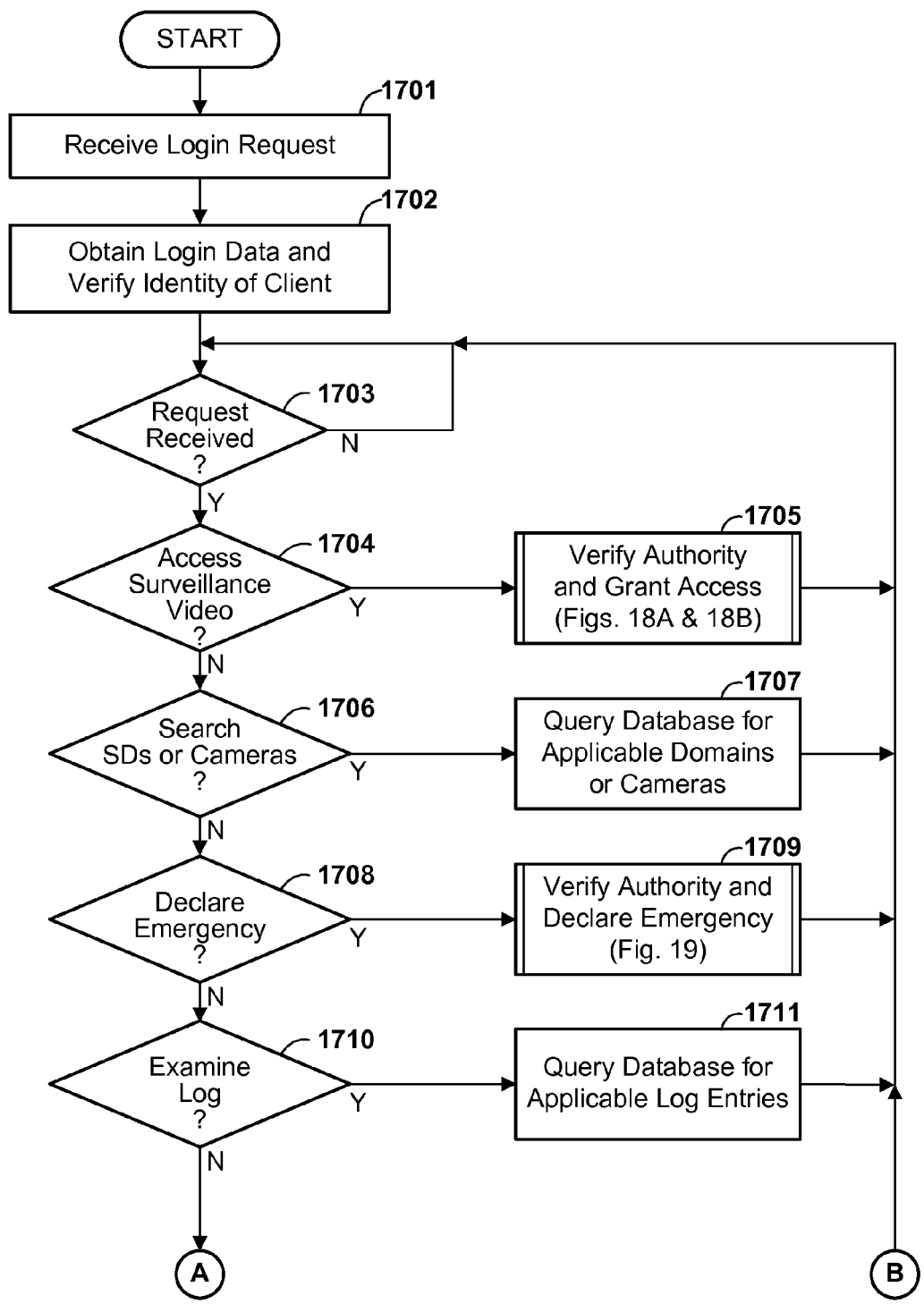
FIGS. 17A and 17B (herein collectively referred to as FIG. 17) are a flow diagram illustrating at a high level the operation of a client service function executing in surveillance video broker, according to the preferred embodiment.
Figure 17B:
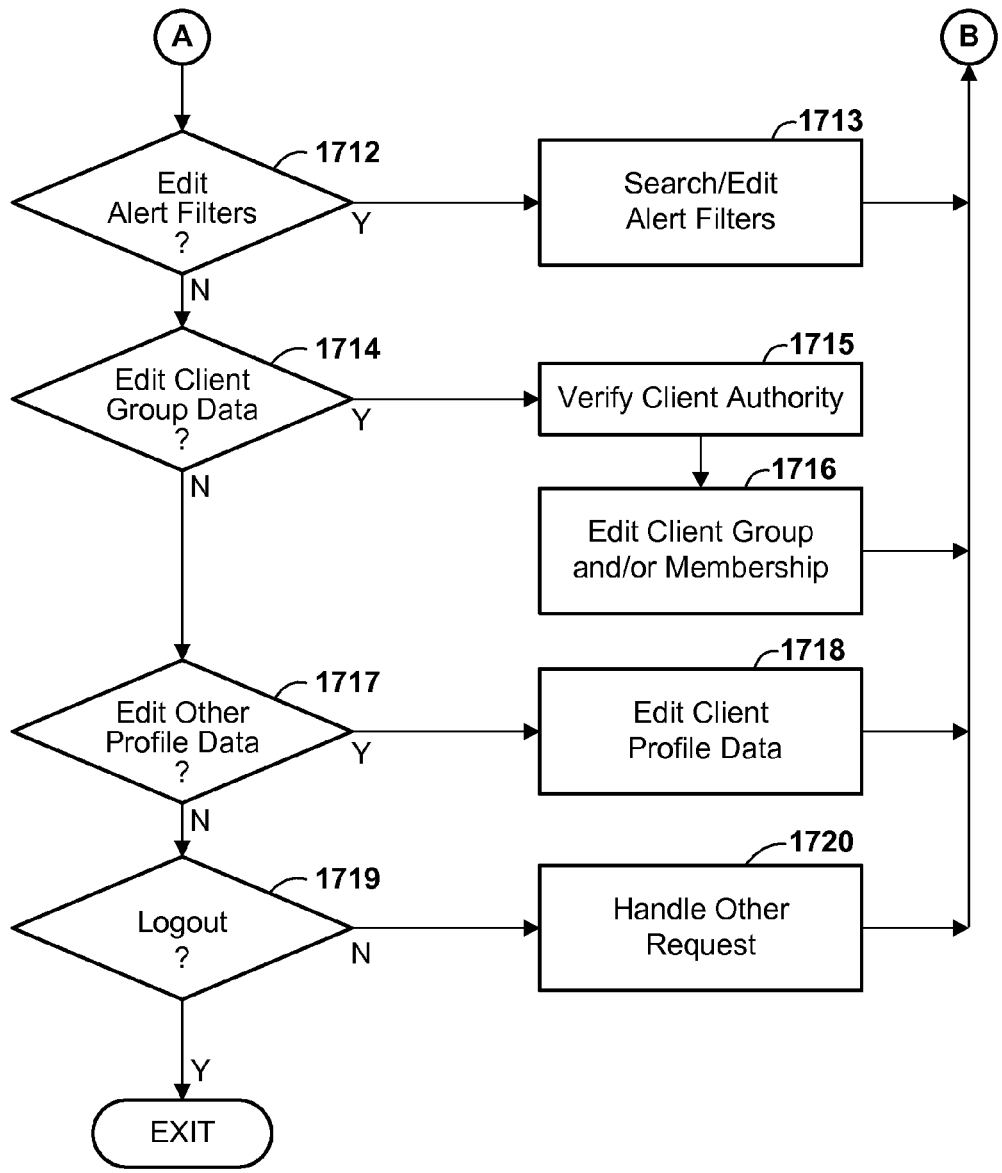

FIGS. 17A and 17B (herein collectively referred to as FIG. 17) are a flow diagram illustrating at a high level the operation of client service function 434 executing in surveillance video broker 103, and providing service to a requesting client 104 connected over network 101, according to the preferred embodiment. Referring to FIG. 17, a previously registered client 104 issues a login request, which is received by broker 103 (block 1701). The broker responds by soliciting the necessary data to verify the identity of the client, and using the data provided to verify the client's identity (block 1702). Identity of the client is preferably verified at login time using techniques similar to those used to verify the identity of the surveillance domain explained above with respect to FIG. 15, although other or additional measures could be used.

Once the identity of the client is verified, the client is logged on to the broker and the broker waits for an incoming service request from the client, represented as the tight loop at block 1703. The delay loop at block 1703 does not necessarily imply that the client service function 434 is continually executing, but it may be placed in an idle state by OS Kernel 401 while awaiting an incoming request. Upon receipt of a request, the request is processed, represented as the 'Y' path from block 1703.

Figure 18A:
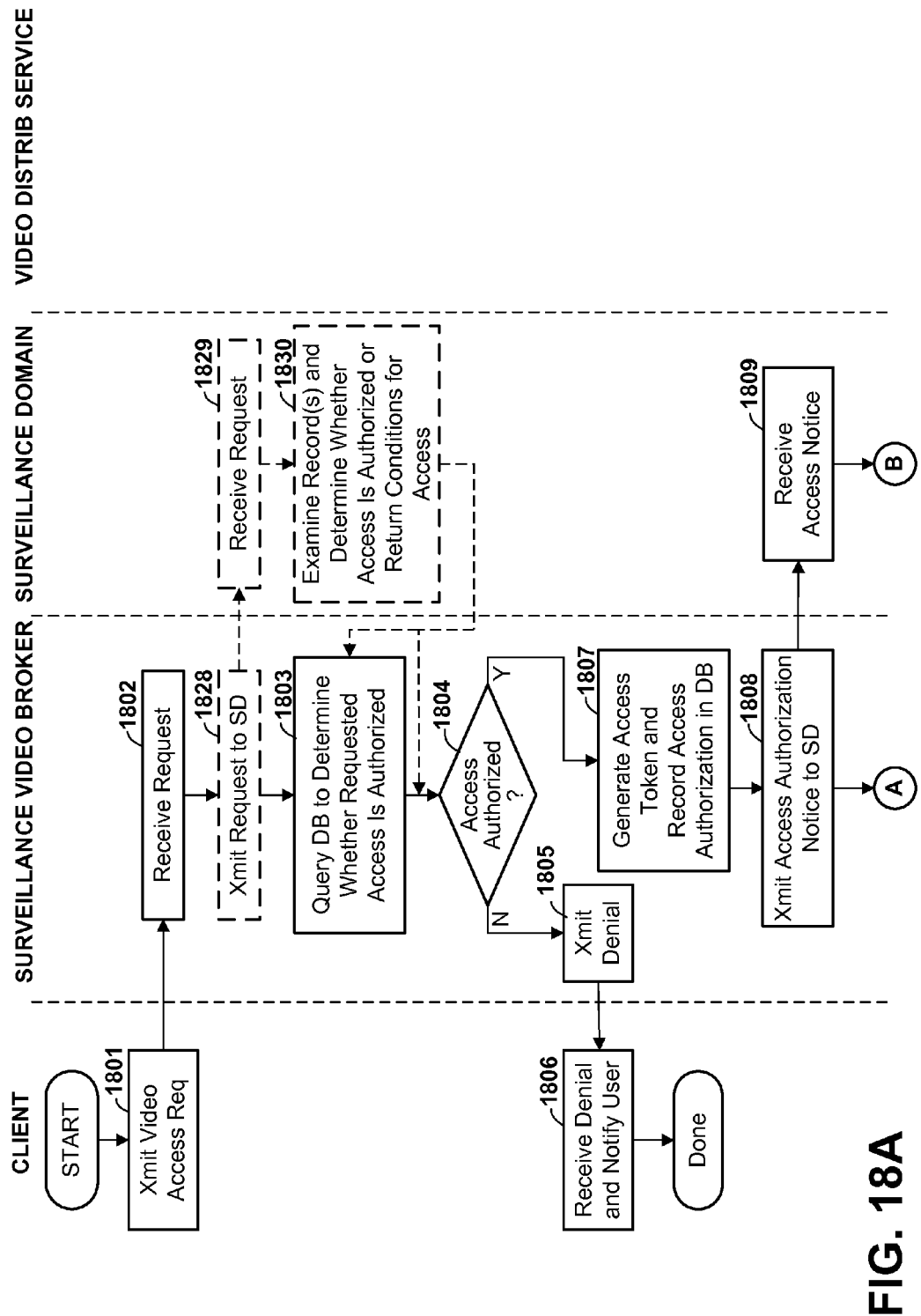
FIGS. 18A and 18B (herein collectively referred to as FIG. 18) are a flow diagram illustrating in greater detail a process for handling a request by a client to access surveillance video, according to the preferred embodiment.
Figure 18B:
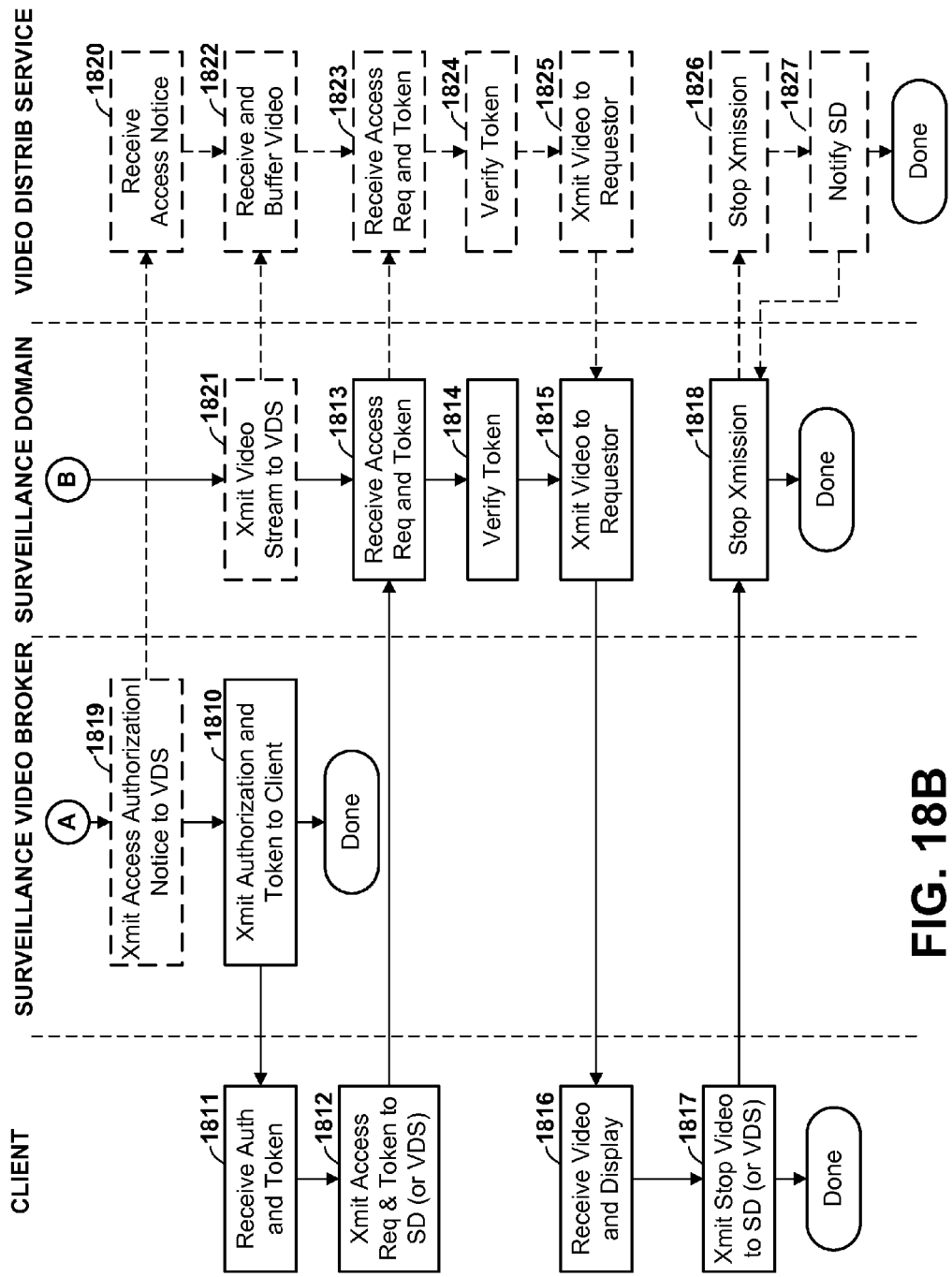

If the incoming request from the client is a request to authorize access to surveillance video produced by a specifically identified surveillance domain, the 'Y' branch is taken from block 1704, and the request to access video is processed by querying the database to determine whether the requesting client is authorized to access the requested surveillance video under current conditions, and generating and transmitting the appropriate authorization or denial in response (represented in FIG. 17 as block 1705, and shown in greater detail in FIGS. 18A and 18B). After servicing the request, control returns to block 1703 to await the next request.

FIGS. 18A and 18B (herein collectively referred to as FIG. 18) are a flow diagram illustrating in greater detail a process for handling a request by a client to access surveillance video, according to the preferred embodiment. In the representation of FIG. 18, actions performed by a client 104 requesting access to surveillance video are shown in the leftmost column, actions performed by surveillance video broker 103 are shown in the second column from left, actions performed by the surveillance domain 102 which produces the requested video are shown in the third column from left, and actions performed by an optional video distribution service 105 (if present) are shown in the rightmost column.

Referring to FIG. 18, a client (previously registered and logged in to broker 103) transmits a request to the broker to access a specific surveillance video stream (block 1801). The video access request includes any necessary parameters, specifically an identification of the surveillance domain and, optionally, a specific camera within that surveillance domain. The client may have knowledge of specific surveillance domains and cameras independently of the broker, or it may first request the broker to search its database 403 for surveillance domains meeting some set of criteria, as explained in greater detail herein with respect to FIG. 17, block 1707, selecting a domain and/or camera from the set of search results for inclusion in the video access request. In the case of a mobile client, the access request may also include a client device location, since access may be conditioned on the locational proximity of the client device. The video access request is received by the broker (block 1802).

Upon receipt of the video access request, video access function 435 executing in broker 103 queries database 403 to determine whether the requesting client is authorized to access the requested video under current conditions (block 1803). (Alternative embodiments in which the surveillance domain itself maintains access authorization records and/or makes the access determination are illustrated as optional blocks 1828-1830, and are discussed below.) A client authorized to access surveillance video is one who is either (a) identified as a recipient, or (b) a member of a client group identified as a recipient, in the recipient ID field 1204 of an entry 1201 in authorizations table 406 which matches the parameters of the received video access request under current condition. This can be determined using standard database query techniques. For example, a query of the form:

```
FIND authorizationrecord in AuthorizationsTable WHERE
    [clientID of requesting client] matches AuthorizationsTable.recptID
AND
    [source domain requested] = AuthorizationsTable.domainID AND
    [source camera requested] matches AuthorizationsTable.cameraID AND
    [current date/time] > AuthorizationsTable.strtdate/time AND
    [current date/time] < AuthorizationsTable.enddate/time AND
    [current time] > AuthorizationsTable.dailystrt AND
    [current time] < AuthorizationsTable.dailyend AND
    [current day] matches AuthorizationsTable.dayofweekflags AND
        [AuthorizationsTable.uf = true OR
        [[currentstatus] matches AuthorizationsTable.c1 AND
        [currentstatus] matches AuthorizationsTable.c2 AND
        .
        .
        .
        [currentstatus] matches AuthorizationsTable.cn AND
        [currentstatus] matches AuthorizationsTable.proximity]]
``` would return a record if the client is directly identified as recipient, and a query of the form:

```
FIND authorizationrecord in AuthorizationsTable WHERE
    [clientID of requestor] = GrpMembTable.clientID AND
    GrpMembTable.groupID = AuthorizationsTable.recptID AND
    [source domain requested] = AuthorizationsTable.domainID AND
    [source camera requested] matches AuthorizationsTable.cameraID AND
    [current date/time] > AuthorizationsTable.strtdate/time AND
    [current date/time] < AuthorizationsTable.enddate/time AND
```

-continued

```
[current time] > AuthorizationsTable.dailystrt AND
[current time] < AuthorizationsTable.dailyend AND
[current day] matches AuthorizationsTable.dayofweekflags AND
    [AuthorizationsTable.uf = true OR
    [[currentstatus] matches AuthorizationsTable.c1 AND
    [currentstatus] matches AuthorizationsTable.c2 AND
    .
    .
    .
    [currentstatus] matches AuthorizationsTable.cn AND
    [currentstatus] matches AuthorizationsTable.proximity]]
``` would return a record if the client is a member of a group identified as a recipient.

As explained previously, multiple authorization records may exist for the same surveillance domain to permit different authorization conditions for different requesting clients, and to allow logical ORs of multiple conditions. For example, if it is desired to allow access if either condition ci or cj is satisfied, there will be two authorization records in authorization table 406, one corresponding to condition ci (in which the other conditions have wildcard values) and one corresponding to condition cj (in which the other conditions have wildcard values). If access is authorized for a declared state of emergency, this condition would typically be expressed in a separate authorization record in which all other conditions have wildcard values.

If no authorization record is found in the database which matches the parameters of the video access request and the current conditions, the 'N' branch is taken from block 1804, and the broker transmits a denial of access message back to the requesting client (block 1805). The requesting client device receives the message and notifies the user, e.g., by display on a display screen (block 1806).

If an authorization record is found which matches the parameters of the video access request and current conditions, the 'Y' branch is taken from block 1804. In this case, video access function 435 generates an access token and records the access authorization in accesses table 407 of database 403 (block 1807). The access token is a generic designation of any data which the client will use to obtain access to the requested video from a provider of the video, which could be the surveillance domain itself or some other provider, such as video distribution service 105. For example, a token may be simply a password, but it may alternatively be a more complex data structure some or all of which may be encrypted, and which may include access information such as an IP address of the provider, port, protocol, information. Preferably, the token is a one-time authorization, at least a part of which is unique to that particular access authorization, and can not be used by other clients or re-used by the same client. The token may include a time duration of the authorization (derived either from end date/time field 1206, daily end field 1209, duration field 1213, or other means, such as a default maximum value), although time duration information may be transmitted separately from the broker to the provider without inclusion in the token.

After generating the token, the broker transmits an access authorization notice to the applicable surveillance domain to notify it that access has been authorized for the requesting client (block 1808). This notice preferably includes the token, allowing the surveillance domain to recognize the token when the client makes its request. The surveillance domain receives and stores the access authorization notice (block 1809).

At this point, two alternative paths of control are represented in FIG. 18. In a first alternative embodiment, represented by block 1810-1818, the surveillance video is provided directly by surveillance domain 102. In this case, blocks shown in dashed lines are not executed. In the second alternative, the video is provided by video distribution service 105.

Specifically, in the first alternative embodiment, the broker transmits the authorization, including the token, to the client (block 1810). Since the client does not necessarily know the address of the applicable surveillance domain, the authorization notice includes this information (which may be contained in the token). The broker has no further role after transmitting the various authorizations, and does not serve as a conduit for the video stream itself. The client receives the authorization and token (block 1811), and transmits an access request containing the token to the surveillance domain at the address provided (block 1812). The address used to access the surveillance domain is not necessarily the same as that used by broker to communicate with local control system 202. Local control system 202 may in fact be multiple systems having multiple addresses, and a separate address may be used for accessing the video stream.

The surveillance domain receives the access request and token (block 1813). It verifies the token based on information earlier received directly from the broker at block 1809 (block 1814). Assuming the token is verified, the surveillance domain then begins transmission of video to the client (block 1815). The client receives the transmitted video and displays it to a user on a display screen at the client (block 1816).

Typically, at some point thereafter the client will decide to stop watching the video stream, and disconnect or otherwise indicate to the surveillance domain that video transmission may be stopped (block 1817). The surveillance domain receives this indication, and halts transmission of the video stream (block 1818). Alternatively, transmission of a video stream may be halted by action of the surveillance domain, e.g., upon expiration of the time duration of any authorization (not shown in FIG. 18).

In the second alternative embodiment employing video distribution service (VDS) 105, the broker not only transmits the authorization to the surveillance domain (block 1808) and the client (block 1810), but also transmits the authorization, including the token, to the video distribution service (block 1819). The video distribution service receives and stores the authorization (block 1820.

Depending on the implementation, a surveillance domain employing a video distribution service may be continually providing video to the VDS at all times, or may do so only on demand. If the surveillance domain is not already providing the video to the VDS, the surveillance domain commences transmission of the video to the VDS responsive to receiving the notification of authorization to access video (block 1821). The VDS receives the video stream and buffers it (block 1822). The VDS may also archive the video for more permanent storage.

Blocks 1810, 1811 and 1812 are performed in the second alternative embodiment as in the first, except that the address for accessing video provided by the broker is the address of the VDS, and the request transmitted by the client at block 1812 is to the VDS. Blocks 1813-1815 are therefore not performed in the second alternative embodiment. The VDS receives the request from the client, including token (block 1823), verifies the token (block 1824), and transmits the requested video stream to the client (block 1825).

The client receives the video transmitted from the VDS and displays it to a user on a display screen at the client (block 1816). When the client thereafter disconnects or otherwise indicates that video transmission may be stopped (block 1817), this is communicated to the VDS, which then halts transmission (block 1826). As in the case of video supplied directly by the surveillance domain, the VDS may act by itself to halt transmission upon expiration of the time duration of any authorization (not shown in FIG. 18). If the video stream is being provided by the surveillance domain to the VDS only on demand, rather than continuously, the VDS will also notify the surveillance domain that it no longer needs the video (block 1827), causing the surveillance domain to halt transmission of video to the VDS.

The video access authorization procedure described above with respect to FIG. 18 is specifically intended for use in authorizing real-time access to a surveillance video stream. However, essentially the same procedure may be used for authorizing access to a previously recorded and archived video stream, although if an optional VDS is used, it would be likely that the archived video is already stored in the VDS, and hence blocks 1821, 1822 and 1827 would not be necessary. Furthermore, the criteria used to authorize access to archived video may be different. For example, the use of an emergency state condition to authorize access to surveillance video in the event of a declared emergency is useful for real-time video, but would have less utility for archived video. To account for these differences, one or more additional flags (not shown) might be included in each video authorization record in authorizations table 406 to indicate whether the corresponding authorization applies to real time or archived video or both. In one variation of the preferred embodiment, conditional access applies only to real-time video, and only a client authorized to unconditional access, or manually given special permission, may access the archived video.

Referring again to FIG. 17, if the incoming request from the client is something other than a request to access surveillance video, the 'N' branch from block 1704 is taken. A client may request the broker to search its database for surveillance domains (or specific cameras) represented as the 'Y' branch from block 1706. A client may request such a search preliminary to a request to access video from one of the domains as described above with respect to FIG. 18, or to find potential unauthorized domains which the client may wish to contact directly and request that the domain include the client in the authorizations recorded in the broker, or for some other reason. In this case, client service function 434 queries database 403 to find applicable surveillance domains or cameras (block 1707). I.e., the client is presented with one or more interactive screens (e.g. interactive web pages) in which to enter the parameters of a search. One or more common searches could be presented to the client in a prepared format, with an option to perform a custom search should the client desire it, using any conventional query technique to specify search terms. The client service function then invokes query engine 422 to perform the search in accordance with the specified parameters, returns search results to the client, and returns to the idle loop at block 1703. For example, a client may wish to search for all surveillance domains to which it is authorized. Alternatively, a client may wish to search for all surveillance domains located within some specified distance from the client. Alternatively, a client may wish to search for a camera at a specific location. Other searches are possible. In returning search results, client service function 434 will filter (i.e., remove from the results) any surveillance domain which has its privacy flag 805 set if the requesting client is not actually authorized to access video produced by the surveillance domain.

If the incoming request is neither a request to access surveillance video nor a request to search domains or cameras (the 'N' branch from block 1706), a client may further request to declare a state of emergency in order to enable emergency services personnel to access certain surveillance video, represented as the 'Y' branch from block 1708. In this case, client service function 434 verifies the authority of the requesting client and handles the declaration of emergency state (represented in FIG. 17 as block 1709, and shown in greater detail in FIG. 19). After servicing the request, control returns to block 1703 to await the next request.

Figure 19:
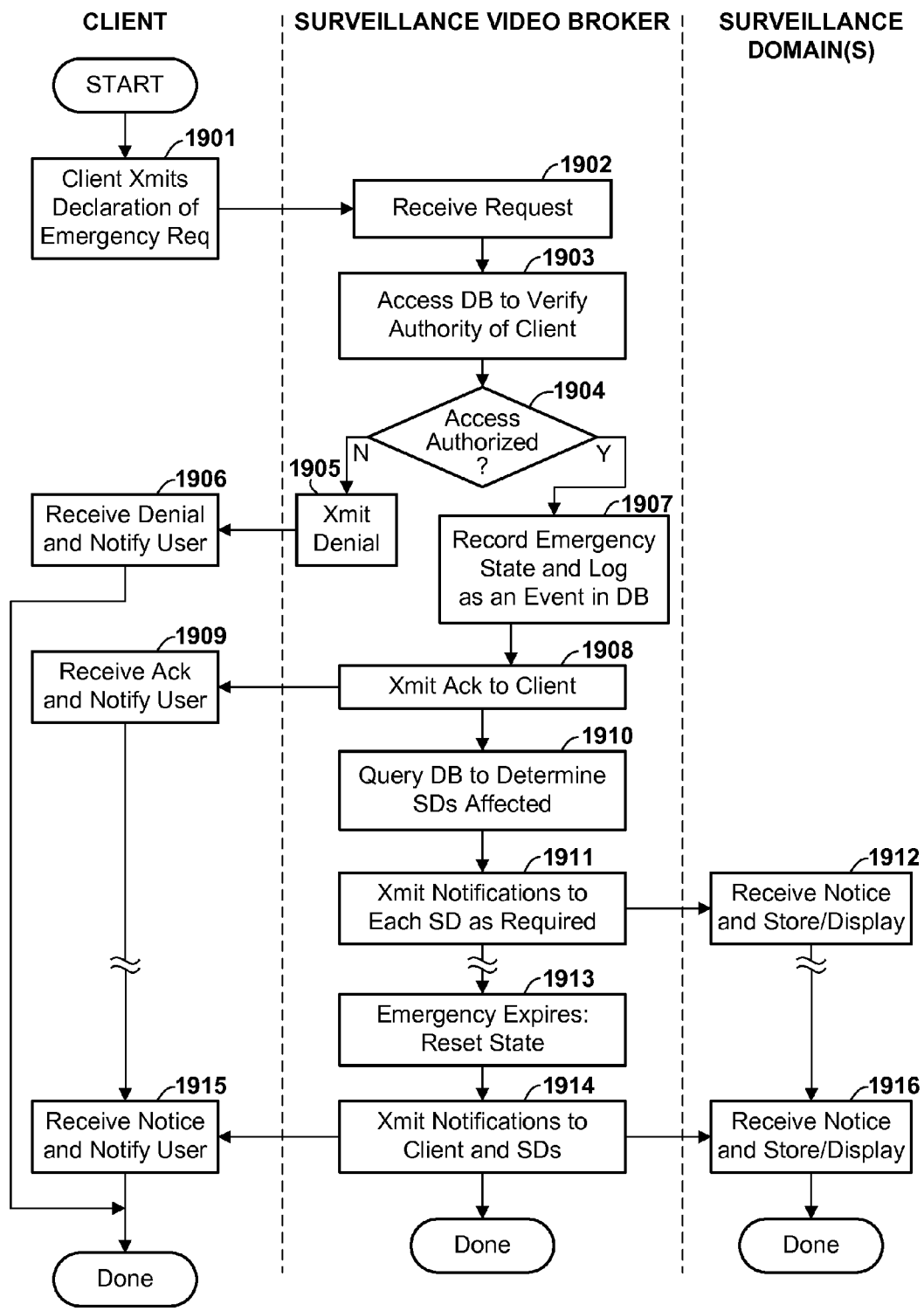
FIG. 19 is a flow diagram illustrating in greater detail a process for handling a request by a client to declare a state of emergency, according to the preferred embodiment.

FIG. 19 is a flow diagram illustrating in greater detail a process for handling a request by a client to declare a state of emergency, according to the preferred embodiment. In the representation of FIG. 19, actions performed by a client 104 requesting the declaration of emergency state are shown in the leftmost column, actions performed by surveillance video broker 103 are shown in the middle column, and actions performed by certain surveillance domains 102 which produce video are shown in the right column.

Referring to FIG. 19, a client (previously registered and logged in to broker 103) transmits a request to the broker to declare a state of emergency (block 1901). The request may include certain parameters, such as a reason for the emergency, a duration of the emergency, and so forth. If no duration is specified in the request, a default duration may be assigned. The decision to declare the emergency is made by a human user, which would typically be an authorized public official. Examples of causes for declaring an emergency could include a fire, a natural disaster such as a tornado, earthquake flood, etc., suspected criminal activity, chemical spill or radiation leak, gas leak, and so forth. An emergency could be restricted to a specific geographical area (e.g. a city block), in which case the parameters of the emergency would include the geographical limitation. In one aspect, an emergency is based on an alert condition detected by a nearby surveillance domain; for example, a fire alarm detected at a first surveillance domain could cause an emergency to be declared for neighboring surveillance domains, enabling access to their surveillance video by firefighters or other emergency responders. The emergency request is received by the broker and stored (block 1902).

Upon receipt of the request to declare an emergency, client service function 434 verifies the authority of the requesting client to declare the emergency state (block 1803). This can be performed by accessing the corresponding entry 501 in clients table 410 and verifying the state of emergency authorization flag 515, or verifying the state of any equivalent or substitute data structure. It will be appreciated that more elaborate mechanisms might be used for verifying authority to declare an emergency, but preferably, in order to respond in the shortest possible time, any such mechanism is pre-authorized in data maintained in the broker, and does not require manual confirmation at the time of the emergency.

In the client's authority to declare a state of emergency can not be verified, the 'N' branch is taken from block 1904, and the broker transmits a denial of emergency state request message back to the requesting client (block 1905). The requesting client device receives the message and notifies the user, e.g., by display on a display screen (block 1906).

If client authority to declare an emergency is verified, the 'Y' branch is taken from block 1904. In this case, client service function 434 records emergency state in a suitable temporary data structure, the emergency state including any necessary parameters such as duration and geographical limitations (block 1907). Since the emergency state is preferably of limited duration, a timer is set to expire upon the expiration of the emergency state. The client service function further records the emergency state grant as an event in events table 405 of database 403, from which it may be subsequently queried and examined for audit or other purposes.

An emergency state having been declared responsive to the client's request, the client service function transmits an acknowledgment of the emergency state back to the requesting client (block 1908). The acknowledgment is received by the requesting client and the user is notified (block 1909).

The client service function further queries the database to determine which surveillance domains might be affected by the declaration of emergency state (block 1910). An affected surveillance domain is one which has one or more video access authorization records in authorizations table 406 which authorize access conditional upon the existence of an emergency state, and which falls within the geographical limitations, if any, of the emergency state. A notification of the declaration of the emergency state is transmitted to each such affected surveillance domain (block 1911), and the affected surveillance domain stores and/or displays the notification to a user (block 1912). The client service function returns to the wait loop at block 1703 of FIG. 17 after transmitting notifications in block 1911.

After some time has elapsed, the emergency expires, which is detected by expiration of the timer set at the time the emergency was declared (block 1913). The client service function reset its state to remove the emergency, preventing any further grant of access based upon the emergency. The record of the emergency is not deleted from events table 405, but is kept there as a permanent record of the emergency. The client service function transmits a notice that the emergency has expired to the requesting client and to each affected surveillance domain (block 1914). The notice is received by the client and displayed to the user (block 1915), and received by the surveillance domains and stored or displayed as appropriate (block 1916).

Referring again to FIG. 17, if the incoming request from the client is neither a request to access surveillance video, nor a request to search surveillance domains, nor a request to declare a state of emergency, the 'N' branch from block 1708 is taken. A client may further request the broker to examine logs of previous events or previous grants of access, represented as the 'Y' branch from block 1710. In this case, client service function 434 queries database 403 to find applicable events or grants of access (block 1711). Events are stored in events table 405, and include any non-scheduled event which might affect authority to access video, such as a declaration of emergency condition or an alarm event issued by a surveillance domain. Grants of video access authority are recorded in accesses table 407. Preferably, the client service function presents the client with one or more interactive screens for input, and standard database search techniques may be used to define the parameters of the search of events table 405 or accesses table 407, as the case may be. The database is searched accordingly, search results are returned to the client, and the client service function returns to the wait loop at block 1703. For reasons of privacy, there may be default rules in place preventing a client from seeing certain events or accesses in which it has no apparent legitimate interest. E.g., a client may view its own accesses or accesses to a surveillance domain to which it has access, but not accesses by others to a surveillance domain to which the client has no access.

If the request from the client is neither a request to access surveillance video, nor a request to search surveillance domains, nor a request to declare a state of emergency, nor a request to examine previously logged events or accesses (the 'N' branch from block 1710), a client may further request to add, delete or otherwise edit alert notification filter records for alerts notifications it wishes to receive, represented as the 'Y' branch from block 1712. In this case, the client service function presents one or more interactive selection and editing screens to a client, allowing the client to search for a previous notification filter record (stored in filters table 409), edit or delete a previous notification filter record when found, and/or generate a new notification filter record (block 1713). This is preferably accomplished by presenting one or more interactive web pages to a user executing a browser application within the client device. Any changes are stored in one or more appropriate entries in filters table 409, and the client service function returns to the idle loop at block 1703.

If the request from the client is neither a request to access surveillance video, nor a request to search surveillance domains, nor a request to declare a state of emergency, nor a request to examine previously logged events or accesses, nor a request to edit alert notification filters (the 'N' branch from block 1712), a client may further request to edit client group data by adding or deleting a group, adding or deleting members from a group, or otherwise editing the group's profile data, represented as the 'Y' branch from block 1714. In this case, if the group is an existing group, client service function verifies authority of the requesting client to alter group data (block 1715). The client has authority if the client is identified as the group's administrator in the admin ID field 603 of the corresponding group record 601 in groups table 414 (or if the client is a member of a group identified as the group's administrator in the admin ID field). If authority is verified (or if the group is a new group, requiring no verification of authority), the client is presented with one or more interactive editing screens allowing it to edit group information, in particular to add or delete members from the group (block 1716). The client service function saves any changes in the database and returns to the idle loop at block 1703.

If the request from the client is neither a request to access surveillance video, nor a request to search surveillance domains, nor a request to declare a state of emergency, nor a request to examine previously logged events or accesses, nor a request to edit alert notification filters, nor a request to edit client group data (the 'N' branch from block 1714), a client may further request to edit other profile data, such as data defining the parameters of the client, represented as the 'Y' branch from block 1717. In this case, the client service function may present one or more interactive selection and editing screens to a client allowing the client to edit the desired information (block 1718). Alternatively, block 1718 may represent certain information provided or edited by an automated program executing in a client device. In particular, in the case of a mobile client device, it may be desirable to periodically update the location of the client device by automatically providing such information to the broker via a series of requests, either at pre-determined intervals or when a current location becomes sufficiently distant from a previously supplied location. Any changes are stored in appropriate location(s) in database 403, and the client service function returns to the idle loop at block 1703.

If the incoming request is none of the above described requests (the 'N' branch from block 1717), a client may further request other services (not including logout), represented as the 'N' branch from block 1719. In this case, the client service function handles the request as appropriate (block 1720). Other request may include, e.g., requests for maintenance and diagnostic services, accounting and billing matters, or any other service which might be useful. After servicing the request, the client service function returns to the idle loop at block 1703. If the request is a logout request (the 'Y' branch from block 1719), the client service function terminates and the client is logged out.

Although a series of steps has been described above as a preferred embodiment, it will be appreciated that many variations of a process for accessing surveillance video and associated tasks are possible, and in particular that some steps may be performed in a different order, that different data structures may be used, and/or that different hardware or software resources may be employed to perform functions described herein.

In the preferred embodiment described above, a surveillance video broker maintains video authorization records on behalf of each of multiple surveillance domains and automatically grants video access to requesting clients based on the pre-existing authorizations in the video authorization records. However, it would alternatively be possible for the broker to forward each access request from a client to the surveillance domain, allowing the surveillance domain to make the determination whether to grant access to its video. In this alternative embodiment, the broker registers and authenticates the clients as described above. A client desiring access to video logs in to the broker and submits its request to the broker as described above, but the broker, rather than determine whether to authorize access, forwards the request to the surveillance domain for action (as shown in optional block 1828 in FIG. 18), which receives the request (optional block 1829). The surveillance domain maintains such records as are necessary to make a determination, with respect to each requesting client and current conditions, whether to authorize access. These records may be similar to those described above and maintained by the broker, except of course that a surveillance domain will only maintain authorization records for itself and not for other surveillance domains. The surveillance domain could then make a determination whether to grant access to the requested video based upon its authorization records and the current state of any conditions which might affect conditional authorization (optional block 1830). If the surveillance domain determines to grant the request, it preferably returns an appropriate message back to the broker (the return path to block 1804), which communicates with the client. The surveillance domain could alternatively communicate directly with the client at this point. As a further alternative, the surveillance domain could maintain one or more authorization records, and transmit the applicable record(s) or data therefrom to the broker upon request responsive to a client request for access (the return path from block 1830 to block 1803), allowing the broker to them make the determination whether to grant access based upon the transmitted authorization record data and the current state of any applicable conditions. These alternative embodiments may have some advantages in terms of providing maximum flexibility for the surveillance domains to make access determinations and reducing the complexity of the broker, but it is believed there are countervailing advantages to the technique described as a preferred embodiment, e.g., avoiding duplication of decision-making software, uniformity of access determinations, ability of the broker to hide unauthorized domains from clients, etc.

In a similar vein, although in the preferred embodiment the broker maintains notification records for determining whom to notify in the event of an alert, in an alternative embodiment the alert message itself could carry notification parameters defining whom to notify. If any filtering of the alert message is to be performed, this could be done in the client. I.e., the broker could transmit alert messages to all clients authorized by the issuing surveillance domain to receive them, and the client could determine whether to display the alert to a user. Furthermore, while in the preferred embodiment the broker handles both access to surveillance video and transmission of alert notifications generated by a surveillance domain, the broker might alternatively handle only the access to surveillance video, alert notifications being handled by a separate mechanism.

In the preferred embodiment described above, the authorization records take the form of records in a relational database which are accessed using general-purpose database search tools. However, in general an authorization record might be anything which records the information necessary to make an access authorization determination, and need not be a record in a relational database. For example, an authorization record might be nothing more than one or more lists of authorized clients, one of which might indicate unconditional access, while one or more others indicate access under respective conditions. Other data structures would alternatively be possible. Notification records or notification filters might similarly take other forms.

In one or more variations of a preferred embodiment, one or more of the clients are employees or other agents of public authorities acting as or on behalf of emergency responders (herein designated a "public authority emergency responder"), such as firefighters, police, emergency medical personnel, or dispatchers or other support personnel. Access to surveillance video generated by a privately-controlled surveillance domain is automatically authorized as described herein upon the occurrence of any of various pre-specified events, such as a specified alarm condition. For example, firefighters may be automatically authorized upon the occurrence of a fire alarm; police may be automatically authorized upon the occurrence of an intruder alarm, store clerk alarm, or similar indication of criminal activity, or any of various events in which police may take an interest, for example a fire. Additionally, such public authority emergency responders may be authorized to access video from a privately-controlled surveillance domain upon declaration of an emergency state, even in the absence of a specific alarm. For example, criminal activity often occurs without an alarm sensor being tripped, and may be detected by visual observation or other means, causing an appropriate person, such as an authorized police official, to declare an emergency. Additionally, such authorization may be conditioned in whole or in part on the location of the public authority emergency responder. This capability substantially increases the ability of emergency personnel to access surveillance video in real time, since it does not first require manual authorization by a person having access control of a privately-controlled surveillance domain, who may be unavailable.

As a further alternative embodiment, the concept of "emergency access" can be broadened to include any arbitrary client or client group, or even all clients, each of whom is allowed to assert a limited "emergency" condition on its own behalf in order to obtain access to surveillance video.

Such limited emergency access is still governed by the surveillance domain's access grants, i.e., the surveillance domain would specify such access rights in one or more access authorization records, as described herein. Such a limited emergency is an "event" which is logged for audit as described herein.

As a further alternative, the concept of a "group" could be applied to surveillance domains as well as clients. I.e., groups of surveillance domains could be defined in the same way that groups of clients are defined, and access rights could be granted by a defined group of surveillance domains to any surveillance video produced by any member of the group. Such a group definition might make management of multiple surveillance domains easier where the multiple domains have common ownership or other characteristics.

In general, the routines executed to implement the illustrated embodiments of the invention, whether implemented as part of an operating system or a specific application, program, object, module or sequence of instructions, including a module within a special device such as a service processor, are referred to herein as "programs" or "control programs". The programs typically comprise instructions which, when read and executed by one or more processors in the devices or systems in a computer system consistent with the invention, cause those devices or systems to perform the steps necessary to execute steps or generate elements embodying the various aspects of the present invention. Moreover, while the invention has and hereinafter will be described in the context of fully functioning computer systems, the various embodiments of the invention are capable of being distributed as a program product embodied in non-transitory computer-readable media, and the invention applies equally regardless of the form of distribution. Examples of non-transitory computer-readable media include, but are not limited to, volatile and non-volatile memory devices, floppy disks, hard-disk drives, CD-ROM's, DVD's, and magnetic tape, it being understood that these examples are not exhaustive. Examples of non-transitory computer-readable media are illustrated in FIG. 3 as system memory 302 and data storage devices 325-327.

Unless inconsistent with the invention or otherwise qualified herein, computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the non-transitory computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although a specific embodiment of the invention has been disclosed along with certain alternatives, it will be recognized by those skilled in the art that additional variations in form and detail may be made within the scope of the following claims:

What is claimed is:

1. A surveillance video broker for managing access to surveillance video by multiple clients, comprising:
   at least one processor;
   a memory;
   at least one network adapter for communicating with a plurality of surveillance domains and a plurality of clients over at least one network;
   a video access controller embodied as a plurality of instructions recordable in said memory and executable on said at least one processor, said video access controller including:
   registration function for independently registering a plurality of surveillance domains and a plurality of clients, each surveillance domain producing at least one respective surveillance video stream, each surveillance domain comprising a respective set of one or more video cameras operated by a respective operating entity common to all video cameras of the respective set, wherein at least some of the video surveillance domains are operated by different respective operating entities;

an access authorization function which, responsive to a request from a client registered by said registration function to access in real time video produced by a target surveillance domain of said plurality of surveillance domains, causes at least one access authorization record corresponding to the target surveillance domain to be accessed to determine whether surveillance video access is authorized, and if surveillance video access is authorized, automatically grants real-time access to the requested video, wherein each surveillance domain registered by said registration function independently defines a respective set of clients authorized to access surveillance video produced by the respective surveillance domain in at least one corresponding access authorization record, each authorization record corresponding to a single respective surveillance domain, each authorization record granting access to one or more respective clients independently of association of the one or more respective clients with the respective operating entity of the corresponding surveillance domain and independently of whether one or more clients have been granted access to one or more other surveillance domains;

a notification function which, responsive to an event alert notification request from a surveillance domain identifying an alert event detected at the surveillance domain for which notification to clients is requested, causes at least one notification record corresponding to the surveillance domain for which notification to clients is requested to be accessed to determine a set of clients to receive notification of the alert event, and transmits an alert notification to each client of the set, wherein each notification record corresponds to a single respective surveillance domain of said plurality of surveillance domains and independently specifies on behalf of the corresponding surveillance domain at least one respective client authorized to receive notification of one or more respective alert events generated by the corresponding surveillance domain, each said notification record specifying at least one respective client authorized to receive notification independently of whether the at least one respective client is authorized by said authorization records to access surveillance video generated by the corresponding surveillance domain; and a plurality of notification filters recorded in said surveillance video broker, each notification filter independently specifying on behalf of a respective client one or more respective alert events for which the client wishes to receive notice;

wherein responsive to receiving each said alert event notification request, said notification function accesses said notification records and said notification filters to determine a respective set of clients to receive notification of the respective alert event, the set being the intersection of a set of clients authorized to receive notification of the respective alert event by said authorization records and a set of clients wishing to receive notification of the respective alert event according to said notification filters.

2. The surveillance video broker of claim 1, wherein at least one authorization record specifies conditional authorization based on at least one respective specified condition.

* * * * *